(12) United States Patent
Lotlikar et al.

(10) Patent No.: US 9,928,091 B2
(45) Date of Patent: Mar. 27, 2018

(54) TECHNIQUES FOR STREAMING VIRTUAL MACHINES FROM A SERVER TO A HOST

(75) Inventors: Mahesh Lotlikar, Sammamish, WA (US); Sriram Sampath, Redmond, WA (US); Ashwin Palekar, Sammamish, WA (US); Olga B. Ivanova, Redmond, WA (US); Dustin L. Green, Redmond, WA (US); Ido Ben-Shachar, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1466 days.

(21) Appl. No.: 12/895,685

(22) Filed: Sep. 30, 2010

(65) Prior Publication Data

US 2012/0084775 A1    Apr. 5, 2012

(51) Int. Cl.
*G06F 9/455* (2006.01)
*H04L 29/08* (2006.01)

(52) U.S. Cl.
CPC ...... *G06F 9/45558* (2013.01); *H04L 67/1097* (2013.01); *G06F 2009/4557* (2013.01)

(58) Field of Classification Search
CPC ...... G06F 9/505; G06F 9/5061; G06F 9/5077; G06F 11/1446; G06F 17/30283; G06F 17/30356; G06F 9/45558; G06F 2009/4557; H04L 67/1097
See application file for complete search history.

(56) References Cited

U.S. PATENT DOCUMENTS

| | | | |
|---|---|---|---|
| 6,968,350 B2* | 11/2005 | Traut et al. | |
| 6,996,706 B1* | 2/2006 | Madden | G06F 9/4406 711/113 |
| 7,577,722 B1 | 8/2009 | Khandekar et al. | |
| 8,073,926 B2* | 12/2011 | Traut | G06F 8/61 709/203 |
| 8,112,496 B2* | 2/2012 | Manasse | G06F 17/3015 706/13 |
| 8,219,592 B2* | 7/2012 | Alpern | G06F 9/45558 707/803 |
| 8,321,863 B2* | 11/2012 | Yamaguchi et al. | 718/1 |

(Continued)

FOREIGN PATENT DOCUMENTS

| | | |
|---|---|---|
| CN | 101075194 A | 11/2007 |
| CN | 101398744 A | 4/2009 |

OTHER PUBLICATIONS

"Using Scripting API for Advanced Operations in Windows Virtual PC", TechNet Archive, Nov. 15, 2009, 1 page.

(Continued)

*Primary Examiner* — James J Lee
(74) *Attorney, Agent, or Firm* — Baker & Hostetler LLP

(57) ABSTRACT

Techniques for configuring a commodity server to host virtual hard disks are disclosed herein. In an exemplary embodiment, a virtual hard disk file can be split into a plurality of differencing VHD files and one or more of the files can be downloaded to a virtualization host as it runs off the VHD files stored on the server. After the one or more VHD files are downloaded, the virtualization host can be configured to use the local copy instead of the copy on the commodity server. In addition to the foregoing, other techniques are described in the claims, the detailed description, and the figures.

20 Claims, 15 Drawing Sheets

(56) References Cited

U.S. PATENT DOCUMENTS

| | | | |
|---|---|---|---|
| 8,341,213 B2* | 12/2012 | Heim | G06F 9/455 709/203 |
| 8,738,781 B2* | 5/2014 | Heim | G06F 9/4416 709/227 |
| 2001/0039586 A1* | 11/2001 | Primak et al. | 709/228 |
| 2002/0147862 A1* | 10/2002 | Traut et al. | 710/1 |
| 2003/0165150 A1 | 9/2003 | Zimmermann et al. | |
| 2006/0253685 A1* | 11/2006 | Wong | G06F 11/3423 712/25 |
| 2007/0094348 A1 | 4/2007 | Scheidel et al. | |
| 2008/0222638 A1 | 9/2008 | Beaty et al. | |
| 2009/0293054 A1* | 11/2009 | Sheehan et al. | 718/1 |
| 2010/0037041 A1 | 2/2010 | Joshi et al. | |
| 2010/0131654 A1 | 5/2010 | Malakapalli et al. | |
| 2010/0162239 A1* | 6/2010 | Wires | G06F 17/30067 718/1 |
| 2010/0180014 A1 | 7/2010 | Kannan et al. | |
| 2010/0191858 A1 | 7/2010 | Thomas et al. | |
| 2011/0040812 A1* | 2/2011 | Phillips | 707/822 |

OTHER PUBLICATIONS

"What's New: Oracle VM 2.1.2", Oracle, Oracle Data Sheet, Sep. 2008, 1-3.

"Windows Server 2008 R2 Hyper-V Benefits to the SMB", Microsoft, Jul. 22, 2009, 1-12.

"Windows Server 2008 R2 Hyper-V™ Live Migration", Microsoft, Jul. 22, 2009, 1-18.

Oberheide et al., "Empirical Exploitation of Live Virtual Machine Migration", Electrical Engineering and Computer Science Department, University of Michigan, (no month available) 2009, 1-6.

Andersen et al.; "Hitachi Universal Storage Platform™ Family Best Practices with Hyper-V"; Best Practice Guide; Hitachi Storage Solutions; Apr. 2009; 32 pages.

European Patent Application No. 11832945.7; Extended Search Report; dated Jul. 25, 2016; 10 pages.

\* cited by examiner

TECHNIQUES FOR STREAMING VIRTUAL MACHINES FROM A SERVER TO A HOST

BACKGROUND

Virtual machine platforms enable simultaneous execution of multiple guest operating systems on a physical machine by running each operating system within its own virtual machine. One exemplary service that can be offered in a virtual machine is a virtual desktop session. A virtual desktop session is essentially a personal computer environment run within a virtual machine that has its user interface sent to a remote computer. In order to virtualize a desktop, an operating system and all of a user's programs and data is encapsulated in a virtual hard disk file (VHD), which is then executed by a virtual processor in a virtual machine; and accessed by a remote client device. This architecture is similar to a remote desktop environment, however instead of having multiple users simultaneously connect to an operating system, each user has access to their own operating system executing in a virtual machine in a virtual desktop environment.

When a virtual desktop is deployed in a datacenter, the virtual hard disk files are typically deployed on a centralized storage server such as a Storage Area Network (SAN) target and virtualization hosts read the virtual hard disk files off the SAN target. This deployment allows the virtual desktop to be dynamically instantiated on any virtualization host in the datacenter. SAN targets make logical unit numbers (LUNs), e.g., disks, available over a high-speed network to the virtualization hosts and unlike network attached storage, SAN targets do not appear as remote storage to the virtualization hosts. SAN targets however, are expensive and it would be beneficial if a commodity server (with low priced central storage) could be used to centrally deploy virtual hard disk files.

SUMMARY

An exemplary embodiment describes a system for deploying virtual hard drives to virtual machine hosts. In the illustrated embodiment, the system can include, but is not limited to, a first server configured to execute a guest operating system off of a collection of virtual hard disk files stored on a second server; store, while simultaneously executing a guest operating system off the collection of virtual hard disk files, a received copy of the collection of virtual hard disk files in a storage device attached to the first server; and execute the guest operating system off the copy of the collection of the virtual hard disk files in response to determining that the copy of the collection of the virtual hard disk files was stored in the storage device attached to the first server. In addition to the foregoing, other techniques are described in the claims, the detailed description, and the figures.

In addition to a computer system, an exemplary embodiment provides an operational procedure for deploying virtual hard drives to virtual machine hosts. The exemplary operational procedure includes, but is not limited to booting a guest operating system from a machine differencing virtual hard disk file stored in a second server and a master virtual hard disk file stored in a storage device attached to the first server, wherein the master virtual hard disk file includes a copy of an operating system and the machine differencing virtual hard disk file includes machine identification information for customizing the copy of the operating system for a user; downloading, while simultaneously booting the guest operating system, a copy of the machine differencing virtual hard disk file from the second server; and executing the guest operating system from the copy of the machine differencing virtual hard disk and the master virtual hard disk file in response to determining that the copy of the machine differencing virtual hard disk file was downloaded. In addition to the foregoing, other techniques are described in the claims, the detailed description, and the figures.

In yet another example, a computer readable storage medium that include executable instructions operable to deploy virtual hard drives to virtual machine hosts. The exemplary computer readable storage medium can include instructions that when executed cause a virtualization host to boot a guest operating system from a collection of virtual hard disk files into a virtual machine, wherein a first portion of the collection is stored on a storage device attached to the first server and a second portion is stored on a second server; download, while booting the guest operating system, at least a sub-portion of the second portion of the collection; and execute the guest operating system off the storage device attached to the first server in response to determining that at least the sub-portion of the second portion of the collection was downloaded to the storage device attached to the first server. In addition to the foregoing, other techniques are described in the claims, the detailed description, and the figures.

It can be appreciated by one of skill in the art that one or more various aspects described herein may include but are not limited to circuitry and/or programming for effecting the herein-referenced aspects; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
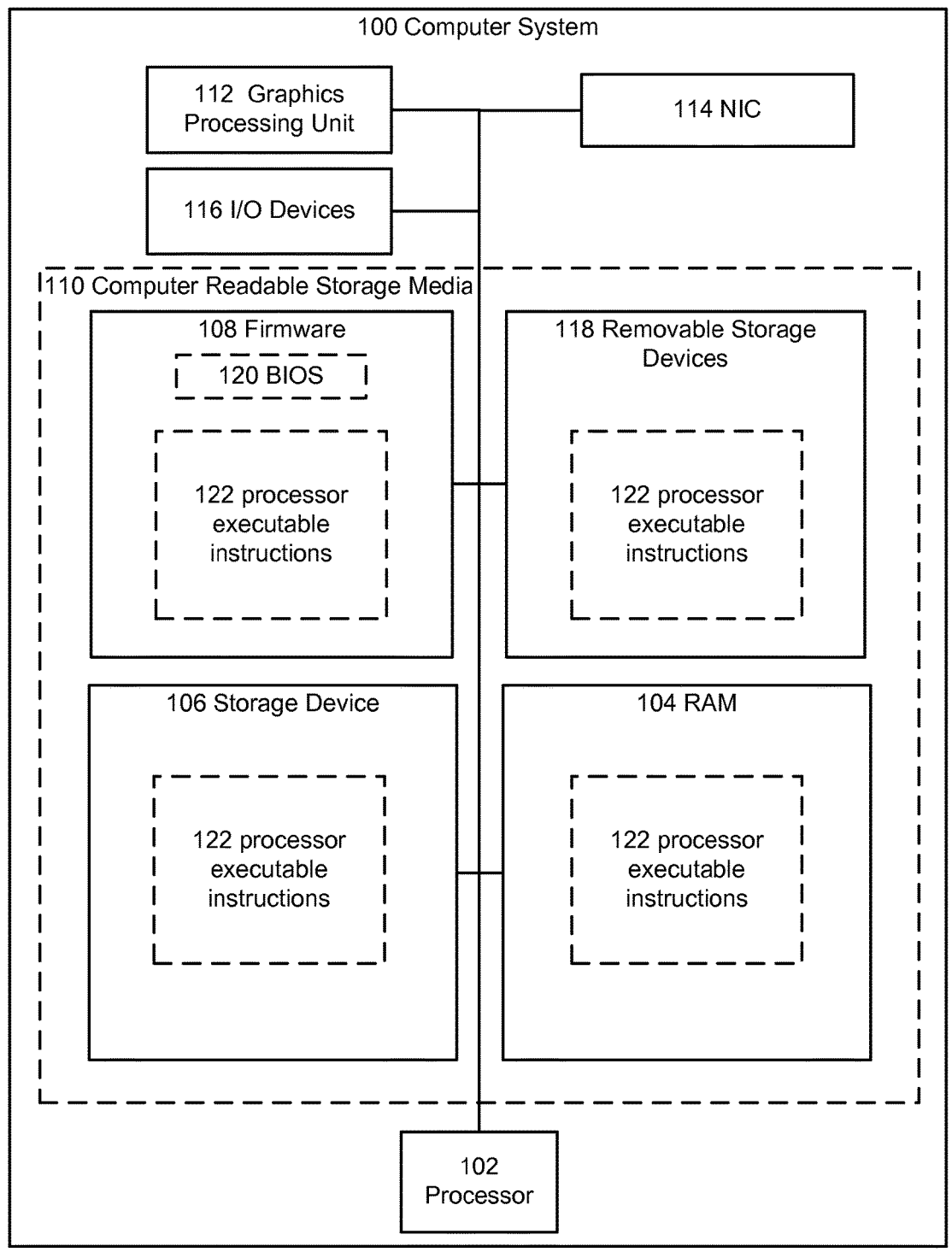
FIG. 1 depicts an example computer system.

The disclosed subject matter may use one or more computer systems. FIG. 1 and the following discussion are intended to provide a brief general description of a suitable computing environment in which the disclosed subject matter may be implemented.

The term circuitry used throughout can include hardware components such as hardware interrupt controllers, hard drives, network adaptors, graphics processors, hardware based video/audio codecs, and the firmware used to operate such hardware. The term circuitry can also include microprocessors, application specific integrated circuits, and a processor, e.g., a core (a unit configured to read and execute instructions) of a multi-core general processing unit, configured by firmware and/or software. Processor(s) can be configured by instructions loaded from memory, e.g., RAM, ROM, firmware, and/or mass storage, embodying logic operable to configure the processor to perform a function(s). In an example embodiment, where circuitry includes a combination of hardware and software, an implementer may write source code embodying logic that is subsequently compiled into machine readable code that can be executed by hardware. Since one skilled in the art can appreciate that the state of the art has evolved to a point where there is little difference between hardware implemented functions or software implemented functions, the selection of hardware versus software to effectuate herein described functions is merely a design choice. Put another way, since one of skill in the art can appreciate that a software process can be transformed into an equivalent hardware structure, and a hardware structure can itself be transformed into an equivalent software process, the selection of a hardware implementation versus a software implementation is left to an implementer.

Referring now to FIG. 1, an exemplary computing system 100 is depicted. Computer system 100 can include processor 102, e.g., an execution core. While one processor 102 is illustrated, in other embodiments computer system 100 may have multiple logical processors, e.g., multiple execution cores per processor substrate and/or multiple processor substrates that could each have multiple execution cores. As shown by FIG. 1, various computer-readable storage media 110 can be interconnected by one or more system busses which couples various system components to the processor 102. The system buses may be any of several types of bus structures including a memory bus or memory controller, a peripheral bus, and a local bus using any of a variety of bus architectures. In example embodiments the computer-readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer-readable storage media can be used such as magnetic cassettes, flash memory cards, and/or digital video disks.

The computer-readable storage media 110 can provide non volatile and volatile storage of processor executable instructions 122, data structures, program modules and other data for the computer 100. A basic input/output system (BIOS) 120, containing the basic routines that help to copy information between elements within the computer system 100, such as during start up, can be stored in firmware 108. A number of programs may be stored on firmware 108, storage device 106, RAM 104, and/or removable storage devices 118, and executed by processor 102 including an operating system and/or application programs.

Commands and information may be received by computer 100 through input devices 116 which can include, but are not limited to, a keyboard and pointing device. Other input devices may include a microphone, joystick, game pad, scanner or the like. These and other input devices are often connected to processor 102 through a serial port interface that is coupled to the system bus, but may be connected by other interfaces, such as a parallel port, game port, or universal serial bus (USB). A display or other type of display device can also be connected to the system bus via an interface, such as a video adapter which can be part of, or connected to, a graphics processing unit 112. In addition to the display, computers typically include other peripheral output devices, such as speakers and printers (not shown). The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
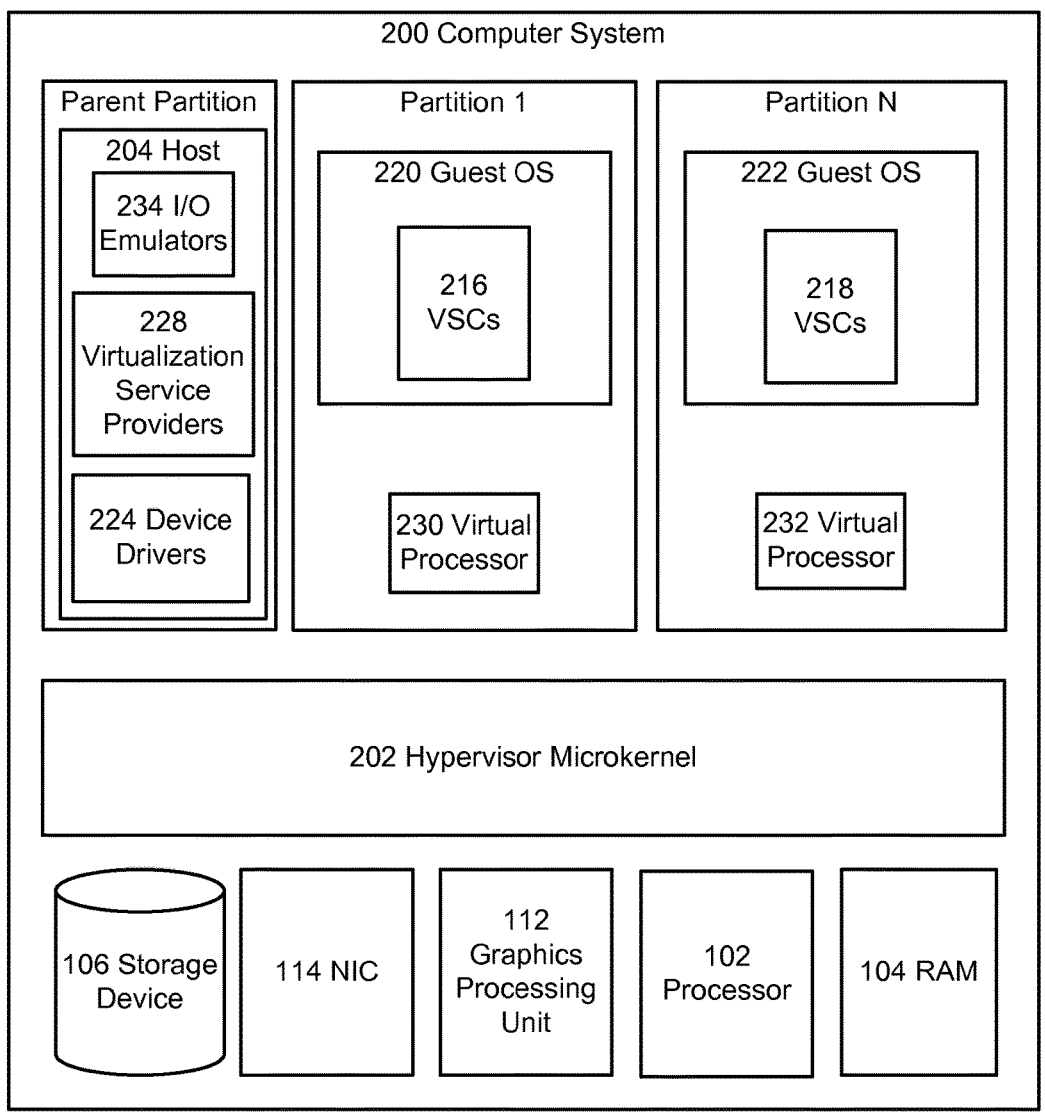
FIG. 2 depicts an operational environment describing an exemplary virtualization platform.

Turning to FIG. 2, illustrated is an exemplary virtualization platform that can be used to generate virtual machines. In this embodiment, hypervisor microkernel 202 can be configured to control and arbitrate access to the hardware of computer system 200. Hypervisor microkernel 202 can isolate processes in one partition from accessing another partition's resources. For example, hypervisor microkernel 202 can generate execution environments called partitions such as child partition 1 through child partition N (where N is an integer greater than 1). In this embodiment, a child partition is the basic unit of isolation supported by hypervisor microkernel 202. Each child partition can be mapped to a set of hardware resources, e.g., memory, devices, processor cycles, etc., that is under control of the hypervisor microkernel 202. In embodiments hypervisor microkernel 202 can be a stand-alone software product, a part of an operating system, embedded within firmware of the motherboard, specialized integrated circuits, or a combination thereof.

Hypervisor microkernel 202 can enforce partitioning by restricting a guest operating system's view of the memory in a physical computer system. When hypervisor microkernel 202 instantiates a virtual machine, it can allocate pages, e.g., fixed length blocks of memory with starting and ending addresses, of system physical memory (SPM) to the virtual machine as guest physical memory (GPM). In this embodiment, the guest's restricted view of system memory is controlled by hypervisor microkernel 202. The term guest physical memory is a shorthand way of describing a page of memory from the viewpoint of a virtual machine and the term system physical memory is shorthand way of describing a page of memory from the viewpoint of the physical system. Thus, a page of memory allocated to a virtual machine will have a guest physical address (the address used by the virtual machine) and a system physical address (the actual address of the page).

A guest operating system may virtualize guest physical memory. Virtual memory is a management technique that allows an operating system to over commit memory and to give an application sole access to a contiguous working memory. In a virtualized environment, a guest operating system can use one or more page tables to translate virtual addresses, known as virtual guest addresses into guest physical addresses. In this example, a memory address may have a guest virtual address, a guest physical address, and a system physical address.

In the depicted example, parent partition component, which can also be also thought of as similar to domain 0 of Xen's open source hypervisor can include a host 204. Host 204 can be an operating system (or a set of configuration utilities) and host 204 can be configured to provide resources to guest operating systems executing in the child partitions 1-N by using virtualization service providers 228 (VSPs). VPSs 228, which are typically referred to as back-end drivers in the open source community, can be used to multiplex the interfaces to the hardware resources by way of virtualization service clients (VSCs) (typically referred to as front-end drivers in the open source community or paravirtualized devices). As shown by the figures, virtualization service clients execute within the context of guest operating systems. However, these drivers are different than the rest of the drivers in the guest in that they may be supplied with a hypervisor, not with a guest. In an exemplary embodiment the path used to by virtualization service providers 228 to communicate with virtualization service clients 216 and 218 can be thought of as the virtualization path.

As shown by the figure, emulators 234, e.g., virtualized IDE devices, virtualized video adaptors, virtualized NICs, etc., can be configured to run within host 204 and are attached to resources available to guest operating systems 220 and 222. For example, when a guest OS touches a memory location mapped to where a register of a device would be or memory mapped to a device, microkernel hypervisor 202 can intercept the request and pass the values the guest attempted to write to an associated emulator. The resources in this example can be thought of as where a virtual device is located. The use of emulators in this way can be considered the emulation path. The emulation path is inefficient compared to the virtualized path because it requires more CPU resources to emulate device than it does to pass messages between VSPs and VSCs. For example, the hundreds of actions on memory mapped to registers required in order to write a value to disk via the emulation path may be reduced to a single message passed from a VSC to a VSP in the virtualization path.

Each child partition can include one or more virtual processors (230 and 232) that guest operating systems (220 and 222) can manage and schedule threads to execute thereon. Generally, the virtual processors are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in an embodiment including multiple logical processors, virtual processors can be simultaneously executed by logical processors while, for example, other processor execute hypervisor instructions. The combination of virtual processors and memory in a partition can be considered a virtual machine.

Guest operating systems (220 and 222) can be any operating system such as, for example, operating systems from Microsoft®, Apple®, the open source community, etc. The guest operating systems can include user/kernel modes of operation and can have kernels that can include schedulers, memory managers, etc. Generally speaking, kernel mode can include an execution mode in a processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 3:
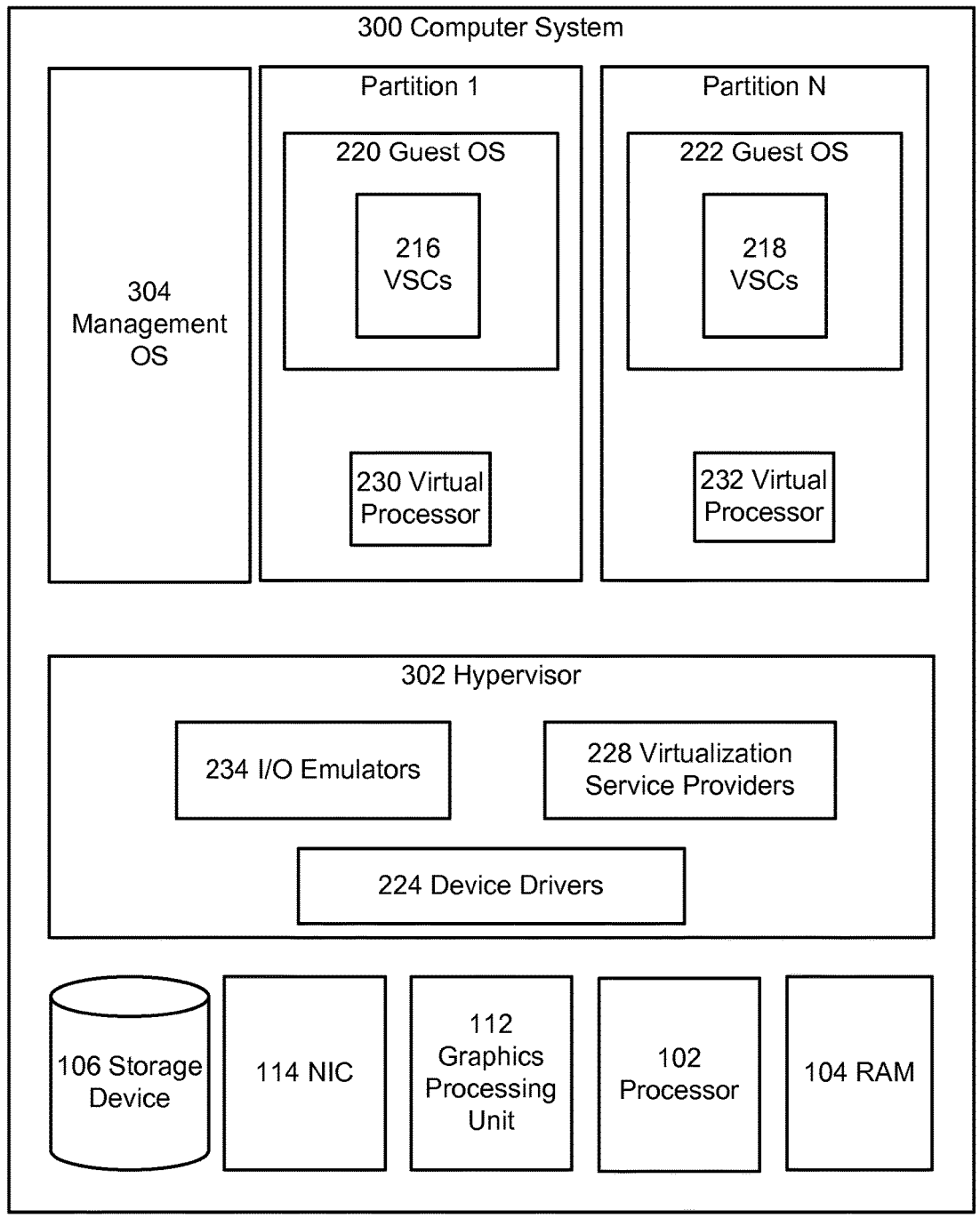
FIG. 3 depicts an operational environment describing an exemplary virtualization platform.

Referring now to FIG. 3, it illustrates an alternative virtualization platform to that described above in FIG. 2. FIG. 3 depicts similar components to those of FIG. 2; however, in this example embodiment hypervisor 302 can include a microkernel component and components similar to those in host 204 of FIG. 2 such as the virtualization service providers 228 and device drivers 224, while management operating system 304 may contain, for example, configuration utilities used to configure hypervisor 302. In this architecture, hypervisor 302 can perform the same or similar functions as hypervisor microkernel 202 of FIG. 2; however, in this architecture hypervisor 302 can be configured to provide resources to guest operating systems executing in the child partitions. Hypervisor 302 of FIG. 3 can be a stand alone software product, a part of an operating system, embedded within firmware of the motherboard or a portion of hypervisor 302 can be effectuated by specialized integrated circuits.

Figure 4:
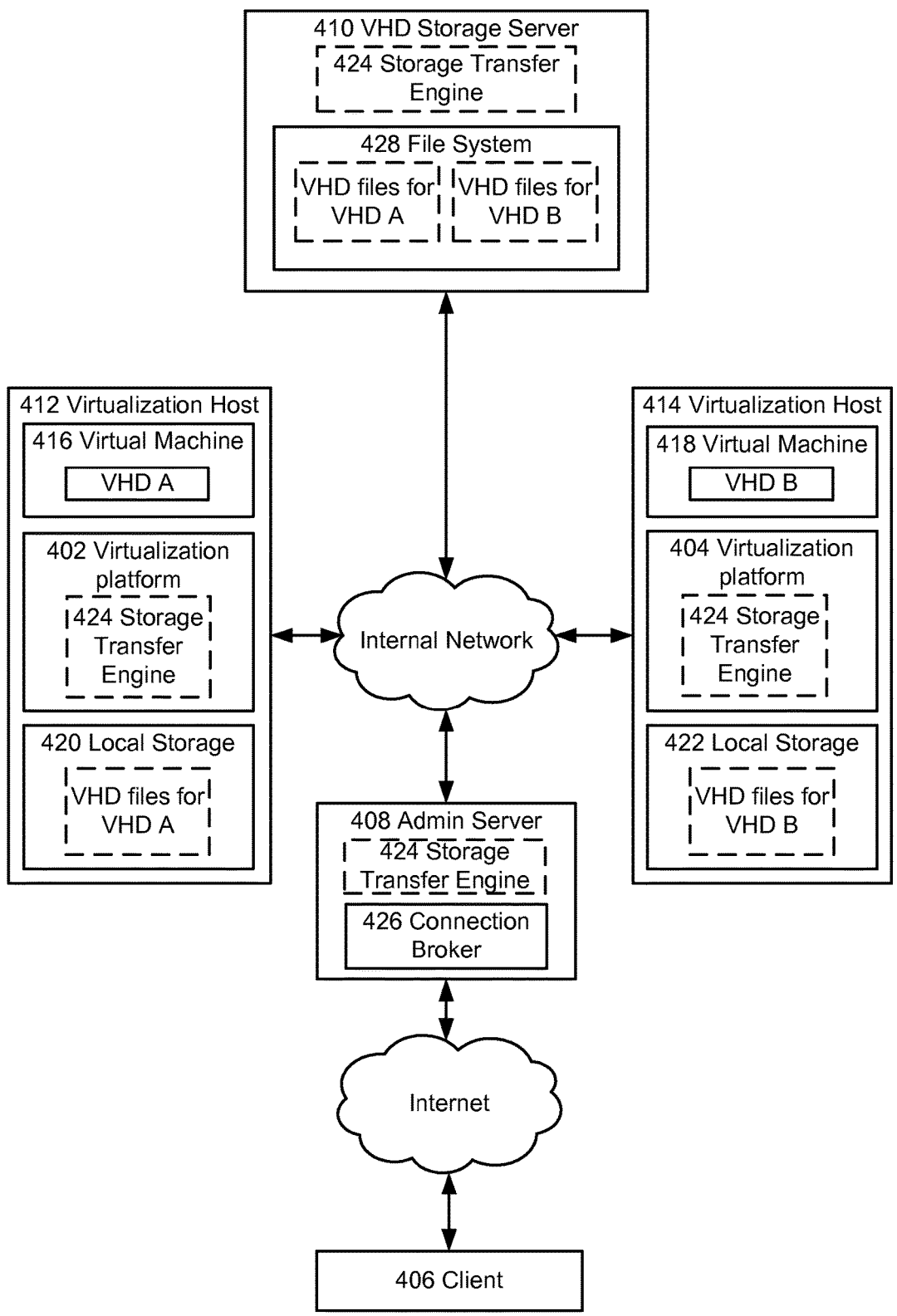
FIG. 4 depicts a high level block diagram of a datacenter.

Turning now to FIG. 4, it illustrates a high-level block diagram of an exemplary datacenter. FIG. 4 generally illustrates an environment for deploying virtual desktops to clients. Briefly, some elements illustrated in FIG. 4 are indicated in dashed lines, which indicate that they are considered optionally located within their illustrated location and/or they could be implemented in a distributed manner. Thus, storage transfer engine 424 can be located on administrator server 408, and/or VHD storage server 410. The following description will call out specific examples of how and where storage transfer engine 424 can be implemented, however the disclosure is not limited to these specific exemplars.

In the illustrated example, the datacenter can include an internal network coupling a plurality of virtualization hosts (412 and 414), which can include components similar to those illustrated by FIG. 2 or 3, to an administrator server 408 and a virtual hard drive (VHD) storage server 410. As one of skill in the art can appreciate, while two virtualization hosts are shown the datacenter can have many more. Also, while each virtualization host (412 and 414) is illustrated running one virtual machine (416 and 418), each virtualization host can simultaneously host many more virtual machines. Or put another way, the datacenter can have M (where M is an integer greater than 1) virtualization hosts and each of the M virtualization hosts can host N (where N is also an integer greater than 1) virtual machines. Virtualization platforms 402 and 404 are logical abstractions of virtualization infrastructure components such as those described above in FIG. 2 and FIG. 3. The functionality described in the following sections as "within" virtualization platform 402 or 404 can be implemented in one or more of the elements depicted in FIG. 2 or FIG. 3.

Administrator server 408, which can include components similar to computer system 100 of FIG. 1, can also include circuitry for connection broker 426, e.g., a processor configured by instructions loaded from a computer-readable storage medium. Connection broker 426 can receive virtual desktop requests from clients and can select a host to run the user's virtual machine. Administrator server 408 can send a configuration file for the user to virtualization host 412. Virtualization host 412 can include a virtual machine engine (not illustrated), which can be implemented within virtualization platform 402, that can execute and instantiate virtual machine 416 in accordance with the information in the configuration file. As part of the instantiation process, and described in more detail in the following paragraphs, virtualization platform 402 can be configured to determine the location of the virtual hard disk files for virtual machine 416 in order to boot a guest operating system stored therein.

VHD storage server 410 can include components similar to computer system 100 of FIG. 1. In exemplary embodiments, instead of being implemented on an expensive SAN, VHD storage server 410 can be built from commodity parts such as general purpose processing units, 1 or 100 gigabit network adaptors, serial advanced technology attachment (SATA) hard disks, small computer system interface (SCSI) hard disks. VHD storage server 410 can load a commodity operating system, e.g., Windows Server 2008®, which can control the hardware of the computer system. In this example, the operating system can execute instructions operable to implement an application-layer network protocol that provides shared access to files stored in a file system controlled by the operating system. Instead of exposing LUNs like a SAN, VHD storage server 410 shares its file system 428 on the internal network. Thus, in this exemplary embodiment virtualization hosts can detect VHD storage server 410 as a networked storage device. In operation, virtualization hosts send requests to read files in VHD storage server's file system and the operating system running on VHD storage server 410 retrieves the desired data.

VHD storage server 410 can store a plurality of virtual hard disk files in its file system 428. Briefly, a virtual hard disk file is a virtual representation of a physical hard disk and stores blocks of data, e.g., sequences of bytes or bits, that represent data structures such as guest operating systems and the data stored in the guest's file systems (files, folders, etc.). A virtualization platform can receive input/output (IO) jobs that have been issued from the guest and execute them on the guest's behalf. Booting and running a guest OS from VHD storage server 410 however, can cause severe latency issues since VHD storage server 410 is not optimized for this deployment. For example, it may take over a minute from boot the guest, e.g., measured from the time the boot loader starts until it exits, when virtualization platform 402 has to read bytes of a VHD off of VHD storage server 410. This operation could take significantly longer if multiple users are attempting to logon to their virtual desktops at the same time. In order to expedite this process, in exemplary embodiments, each VHD can be broken up into multiple differencing VHD files and storage transfer engine 424 can selectively cache the different files (or portions thereof) in various locations in the datacenter.

In exemplary embodiments, the data that represents a virtual hard disk can be broken up into multiple files and the combination of data forms the virtual hard disk including a guest operating system. A differencing virtual hard disk file represents the current state of a virtual hard disk as a set of modified blocks in comparison to a parent image. The parent image can be another differencing virtual hard disk file or a base virtual hard disk file. Because of this, each differencing virtual hard disk file can include a unique identifier; the identifier of its parent; and a value that identifies the location of its parent. Each differencing VHD file can be linked together and the chain of links can point to the location of a base virtual hard disk file.

In exemplary embodiments, each virtual hard disk can be broken up into three virtual hard disk files. While three virtual hard disk files are illustrated, the disclosure is not limited to this configuration and a virtual hard disk could be broken up into two virtual hard disk files or many more. In an exemplary embodiment, a virtual hard disk file can be formed from a master VHD file, a machine differencing VHD file, and a user differencing VHD file. The master VHD file can include a copy of an operating system similar to what is found on an OS installation DVD and sold to consumers. The master VHD file can also include programs that are used by users in the datacenter. For example, the master VHD file can come with office productivity software if the datacenter is being provisioned for users that require such software. In another example, if the expected users are web-designers, the master VHD file could include web-deigning software.

A machine differencing VHD file can be linked to the master VHD file. Essentially, the machine differencing VHD file can include blocks of data that provision the master VHD file for a specific user. For example, the machine differencing VHD file can include the data that separates one user's computing environment from another such as a machine identifier, an active directory identifier, etc. In an exemplary embodiment, a machine differencing VHD file can exist for every unique user account in the datacenter. In the same or another embodiment, every master VHD file can be linked to the same master VHD file.

In another exemplary embodiment, a user differencing VHD file can optionally be used. In the example embodiment where a user differencing VHD file is used, it can be linked to the master VHD file and used to store the blocks of data that are written to disk during a session. For example, when a user interacts with a virtual desktop the guest operating system writes information to disk. In an exemplary embodiment, these blocks of data can be stored in a user differencing VHD file. In the same, or another embodiment, data written to disk during a snapshot can be stored in user differencing VHD file. Thus, the user differencing VHD file can be writable whereas the machine differencing VHD file and the master VHD file are set as read-only. In this exemplary configuration, only the data on the user differencing VHD file changes when the virtual machine is running.

In an exemplary configuration, the location of the last virtual hard disk file in the chain can be stored in a configuration file for the virtual machine. When a virtualization platform receives a request to instantiate the virtual machine, the virtualization platform can read the configuration file to discover the location of the last link in the chain. The virtualization platform can then discover the location of its parent and open the parent. The virtualization platform can continue to discover virtual hard disk files in the chain until it discovers the location of the base virtual hard disk file and opens it.

In another exemplary embodiment, the location of the last read-only virtual hard disk file in the chain can be stored in the configuration file, e.g., the machine differencing VHD file. In this example, the user differencing VHD file can be dynamically created when booting the virtual machine. For example, a process in virtualization platform 402, e.g., a virtual machine engine, can create the user differencing VHD file in response to detecting a parent location value indicative of a read-only file. In this example, the virtual machine engine can create the user differencing VHD file and dynamically link it to the read-only file.

Virtualization platform can use bitmaps and a preconfigured order of operations to read and write to the collection of virtual hard disk files. For example, each virtual hard disk file can include a bitmap and data. The bitmap indicates which blocks of data are in the differencing disk (1's) and which blocks of data are not (0's). In this exemplary embodiment, when a virtualization platform, i.e., a storage service running in the virtualization platform, attempts to read from the collection of files, it can be configured to attempt to read from the user differencing virtual hard disk file first and if the blocks are not present, it can copy to the machine differencing virtual hard disk file. In the event that the blocks are not in either file, virtualization platform 402 can be configured to read the blocks from the master virtual hard disk file. For write operations, virtualization platform 402 can be configured to write to the first link in the chain, e.g., the user differencing VHD file, and mark the corresponding block in the file's bitmap as a 1. Subsequent read IO jobs to this block of data can be directed to the user differencing VHD file.

Turning back to FIG. 4, in an exemplary embodiment storage transfer engine 424 can be configured to selectively download VHD files to virtualization hosts local storage while the virtual machine is running After the virtual hard disk files are downloaded, virtualization platform, e.g., microkernel hypervisor 202 of FIG. 2, can reconfigure the parent location value in each VHD file and/or the configuration file to point to the local copies of the files using a "Setparent" command. By selectively downloading the VHD files, the number of disk operations happening on VHD storage server 410 is minimized and the stress of handling storage operations for M virtual machines is eliminated.

After the user logs off, writes made to a user differencing VHD file can be discarded (in a pooled deployment) or merged with, for example, the machine differencing VHD file (in a personal virtual machine deployment). The merge operation can occur at one of a plurality of locations in the datacenter. In a first embodiment, local copies of both files can be merged on a virtualization host. In a second embodiment, local copies of both files can be merged on VHD storage server 410. In a third embodiment, storage transfer engine 424 running on a virtualization host merge a copy of user differencing VHD file in local storage 420 with a machine differencing VHD file stored in VHD storage server 410. In a forth embodiment, storage transfer engine 424 running on VHD storage service 410 can merge a copy of user differencing VHD file in local storage 420 with a machine differencing VHD file stored in VHD storage server 410. The location of the merge operation can be selected by a server administrator.

Regardless of where the copy operation occurs, storage transfer engine 424 can merge the differences stored in a user differencing VHD file with machine differencing VHD file by copying the blocks of data in a user differencing VHD file into the corresponding blocks on a machine differencing VHD file. VHD storage server 410 can receive a copy of the modified machine differencing VHD file and overwrite its copy of the file with the modified version. At this point, the virtualization host, e.g., virtualization host 412, can delete its copy or continue to store it in local storage, e.g., local storage 420. In the instance that it stored in local storage 420, a signal can be sent to administrator server 408 that indicates the timestamp of its copy of the machine differencing VHD file. In the event that the user logs on again, connection broker 426 can compare the timestamp of the machine differencing VHD file stored in local storage 420 to the timestamp of the corresponding file in VHD storage 410. In the event that the timestamps match, connection broker 426 can be configured to attempt to instantiate virtual machine 416 on virtualization host 412 instead of on a different host in the datacenter.

FIGS. 5-8 illustrate different deployment configurations. The selection of a deployment configuration is left to an implemented; however, the selection can be made by taking the available bandwidth of the internal network and the available bandwidth of the internal buses that connect the processor of VHD storage service 410 to the physical storage devices, e.g., the internal SATA bus bandwidth into account. For example, a network administrator can test his or her datacenter to see how long it takes to boot an operating system from VHD storage server 410 with all the VHD files stored on VHD storage server 410. If it takes too long (based on preference), the administrator can use one of the different deployment configurations described herein. In the instance that the administrator wants to maximize performance, he or she can use a deployment that minimizes the amount of data that has to be sent over the internal network.

In the same or another embodiment, storage transfer engine 424 can be configured to selectively copy certain files based on an algorithm that minimizes the amount of the available bandwidth used to copy VHD files. In the same or another embodiment, the algorithm can be configured to detect which file handles the most IO jobs and copy that file.

Figure 5:
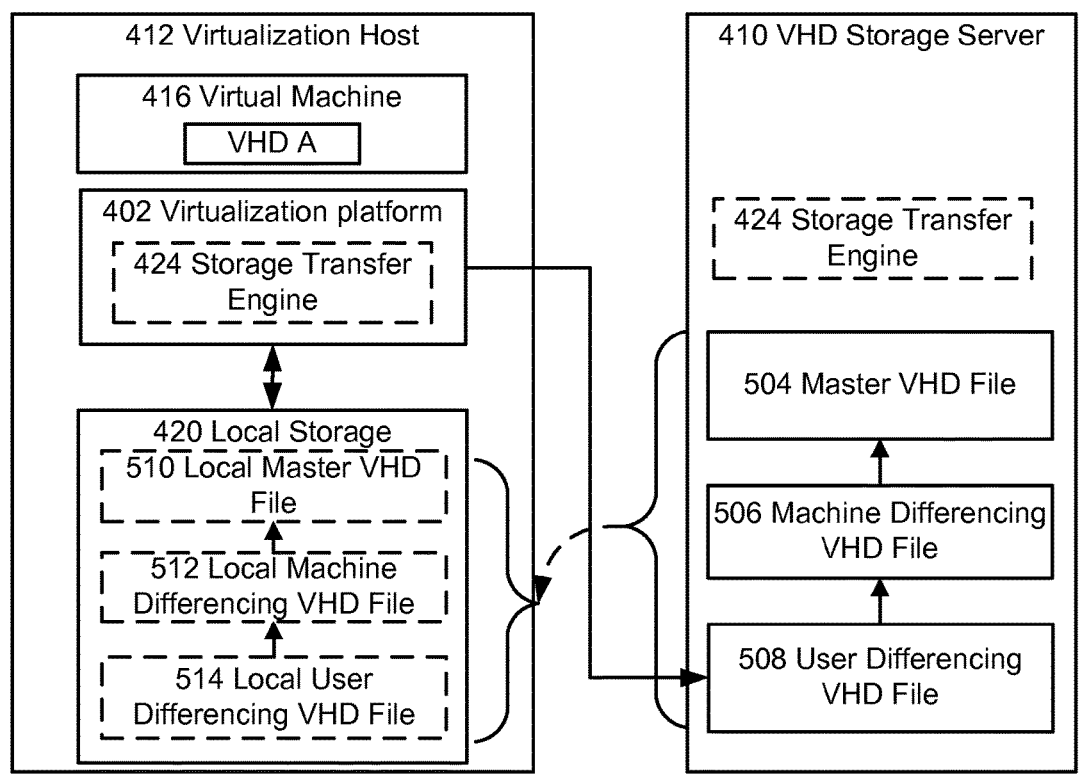
FIG. 5 depicts a high level block diagram of a virtualization host and a VHD storage server.

Turning to FIG. 5, it illustrates an exemplary deployment. In the illustrated embodiment, storage transfer engine 424 has been configured to copy master VHD file 504, machine differencing VHD file 506, and user differencing VHD file 508 to local storage 420 after a determination is made by connection broker 426 of FIG. 4 to instantiate virtual machine 416 on virtualization host 412. The dashed lines in this figure and the following figures illustrate that copies of master VHD file 504, machine differencing VHD file 506, and user differencing VHD file 508 can be copied from VHD storage server 410 to virtualization host 412.

In an exemplary embodiment, a copy operation can begin prior to booting. For example, the operation can begin as soon as virtualization platform 402 determines the location of the collection of files. In another embodiment, the copy operation can begin when storage transfer engine 424 on VHD storage server 410 receives a request to open the collection of files from virtualization platform 402.

In both cases, virtualization platform 402 can start the process in response to receiving a configuration file. Virtualization platform 402 can open the file and read a VHD location field that could include, for example, the network path of user differencing file 508, which could be \\VHDstorageserver\share\ . . . \ userXXXuserdiff.vhd. Virtualization platform 402 can send a request to VHD storage server 410 to open up this file and VHD storage server 410 can handle the request. Virtualization platform 402 can then read a value that indicates the location of user differencing VHD file's parent, which could be \\VHDstorageserver\share\ . . . \ userXXXmachinediff.vhd. Similarly, virtualization platform 402 could then discover that that machine differencing VHD file's parent is located at \\VHDstorageserver\share\ . . . \ master.vhd. Each of these links is illustrated in the figure as arrows.

In an alternative embodiment, the configuration file could include a VHD location value for machine differencing VHD file 506, i.e., \\VHDstorageserver\share\ . . . \ userXXXmachinediff.vhd. In this example, virtualization platform 402 can determine that machine differencing VHD file 506 is read-only and generate user differencing VHD file 508. Virtualization platform 402 can set the parent location for the newly generated user differencing file to point to machine differencing VHD file 506 and change the configuration file to point to the location of the newly generated user differencing file.

After the files are opened, virtualization platform can read the bitmaps and enable a virtual processor in virtual machine 416. An OS boot loader program in virtual machine 416 can issue IO jobs for the first blocks that need to be read in order to boot a guest operating system. Virtualization platform 402 can use the bitmaps to determine which disk includes requested bytes; fetch the bytes from the files opened on VHD storage server 410; and return the bytes to the boot loader.

After the VHD chain is stored in local storage 420, a signal can be sent to virtualization platform 402 to reset the links stored in the VHD files and the configuration file. While virtual machine 416 is running, virtualization platform 402 can change parent location in the configuration file to point to the downloaded copies, e.g., local user differencing VHD file 514 and the parent location information stored in the local copy of machine differencing VHD file 512 can be reset to point to local master VHD file 510. For example, virtualization platform 402, e.g., microkernel hypervisor 202, can include an interface that storage transfer engine 424 can access in order to change the parent location information. In a specific example, the interface can be accessed and the parent location information in the configuration file can be changed from \\VHDstorageserver\share\ . . . \ userXXXuserdiff.vhd to C:\Program Data\ . . . \Virtual Machines\userXXXuserdiff.vhd. At this point, storage transfer engine 424 can close the connection to VHD storage serve 410 and send subsequent IO jobs to the local copies of the VHD files instead of the copies stored on VHD storage server 410. For example, when a read IO job is received by virtualization platform 402, the updated location information can be read and cause virtualization platform 402 to send the job to local storage 420.

Since the VHD files in the chain may be significantly large, e.g., master VHD file 504 alone could be 7 or 8 gigabytes, in an exemplary embodiment a fast file copy technique can be used to reduce the copy time. For example, a background intelligent transfer service (BITS) could be executed on virtualization host 412 and/or VHD storage server 410. BITS can copy files using idle network bandwidth and copy data in the background. In operation, the BITS program can monitor network traffic on VHD storage server 410 and throttle its own copies to ensure that other downloads get the bandwidth they need.

In the same, or another embodiment, VHD storage server 410 can be configured to pre-cache specific blocks of bytes in RAM in order to speed up the copy operation. For example, boot loaders typically require the same blocks of data from master VHD file 504 to perform a logon operation, in an exemplary embodiment these blocks of data can be cached in RAM when VHD storage server 410 boots so that VHD storage server 410 does not have to first fetch the bytes from mass storage. In another example embodiment, in the instance where VHD storage server 410 has enough RAM, the entire master VHD file 504 could be pre-cached.

In an exemplary embodiment master VHD file 504 and machine differencing VHD file 506 can be marked read-only. Thus, these files can be copied to virtualization host 406 without issue. However, user differencing VHD file 508 is read/write and needs to be copied in a way that ensures that user data is lot lost. In an exemplary embodiment, user differencing VHD file 508 starts off with 0 bytes (at boot the file is empty) and quickly grows in size. In this example, when storage transfer engine 424 initiates a copy operation, local user differencing VHD file 514 can be created and virtualization platform 402 can be configured to send write IO jobs to both user differencing VHD file 508 and local user differencing VHD file 514. Storage transfer engine 424 can store a value indicative of a block copy line and can serially start copying blocks to local user differencing VHD file 514 from the beginning of user differencing VHD file 508 to the end while the guest operating system writes to both copies. After a block is copied to local storage 510 the value can be incremented. When the value reaches the end of user differencing VHD file 508 both files are synchronized and storage transfer engine 424 can stop mirroring the writes to user differencing VHD file 508.

Figure 6:
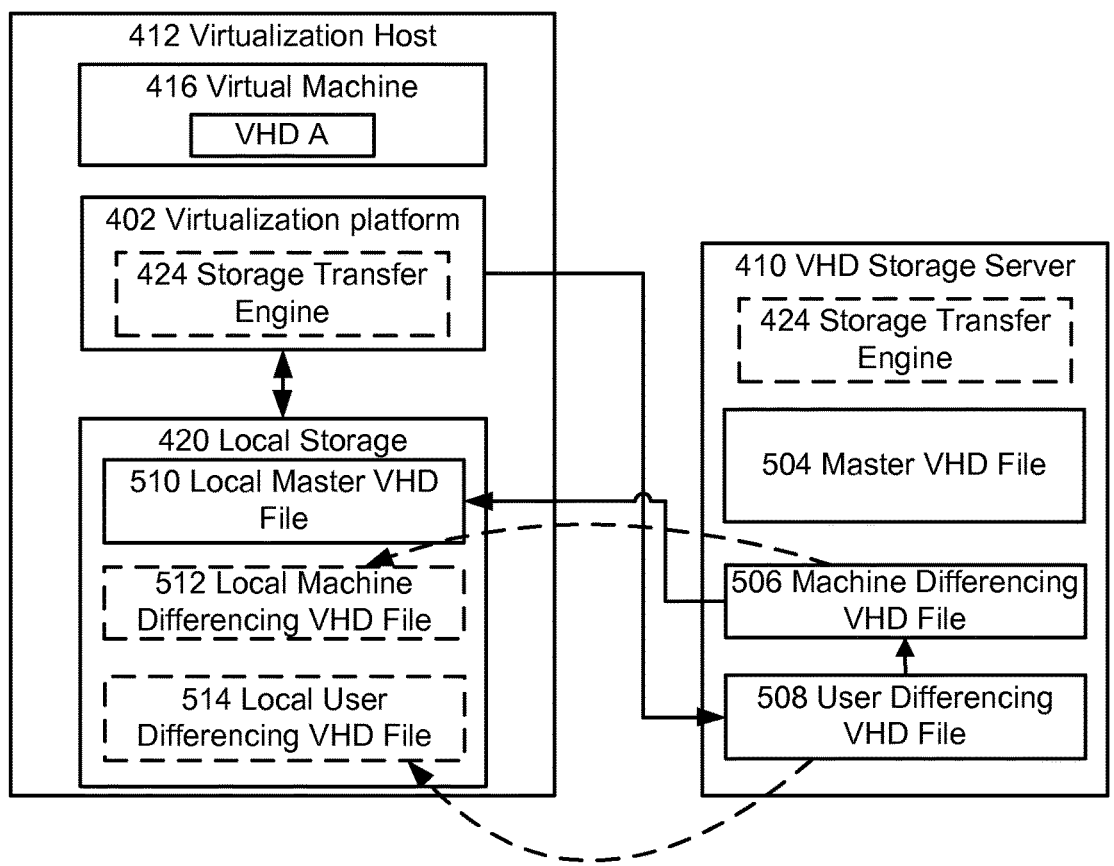
FIG. 6 depicts a high-level block diagram of a virtualization host and a VHD storage server.

Turning to FIG. 6, it illustrates an alternative implementation where a copy of master VHD file is pre-cached on virtualization host 412. In this deployment, each virtualization host in the datacenter can have local master VHD file 510 pre-cached so that it does not have to be copied from VHD storage server 410. In this deployment, VHD storage server 410 may or may not have a copy of master VHD file, however it can include a copy so that virtualization hosts that are added to the datacenter can download a copy. In this exemplary configuration, machine differencing VHD file 506 can include location information that points to the local copy of master VHD file thereby eliminating the situation where read operations to the master VHD file have to be sent over the internal network. Similar to above, after the VHD chain is stored in local storage 420, a signal can be sent to virtualization platform 402 to adjust the parent location information stored in the VHD files and the configuration file.

Figure 7:
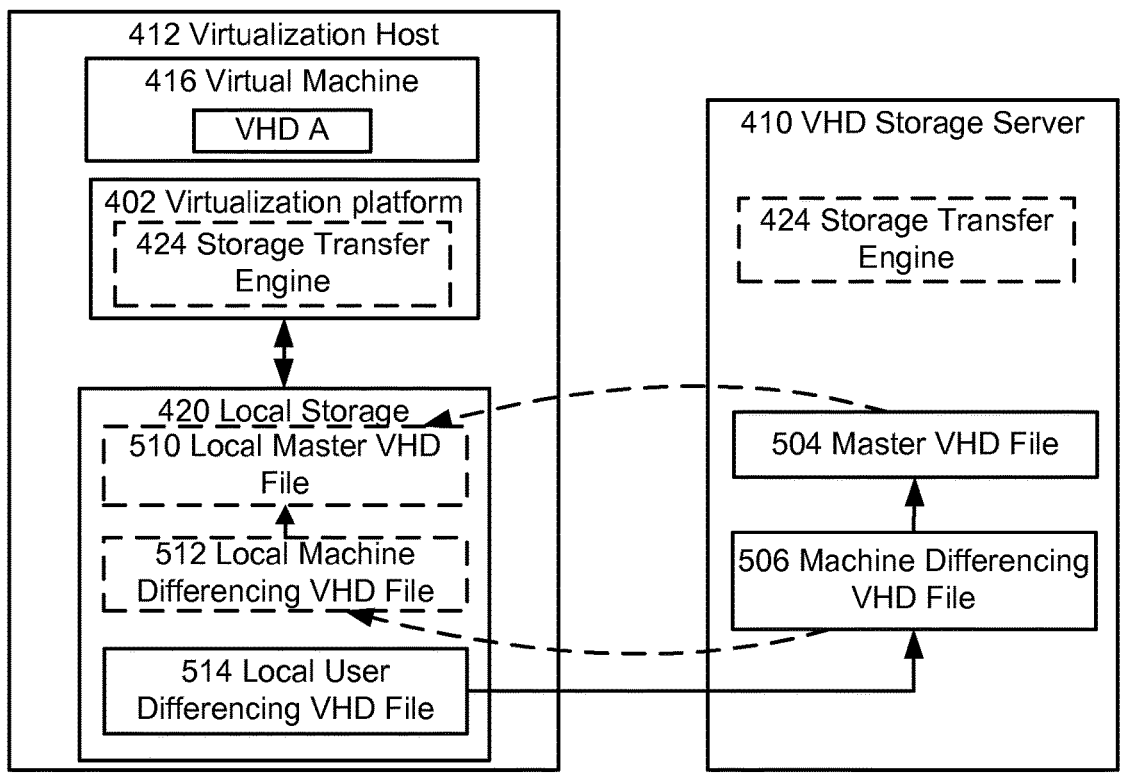
FIG. 7 depicts a high-level block diagram of a virtualization host and a VHD storage server.

Turning to FIG. 7, it illustrates another alternative deployment. In this exemplary embodiment, the configuration file can point to machine differencing VHD file 506 and master VHD file 504. In another configuration, the configuration file can point to local user differencing VHD file 514. During boot, writes can be immediately send to local user differencing VHD file 514 as copies of master VHD file 504 and machine differencing VHD file 506 are downloaded. Similar to above, after the VHD chain is stored in local storage 420, a signal can be sent to virtualization platform 402 to adjust the parent location information stored in the VHD files and the configuration file.

Figure 8:
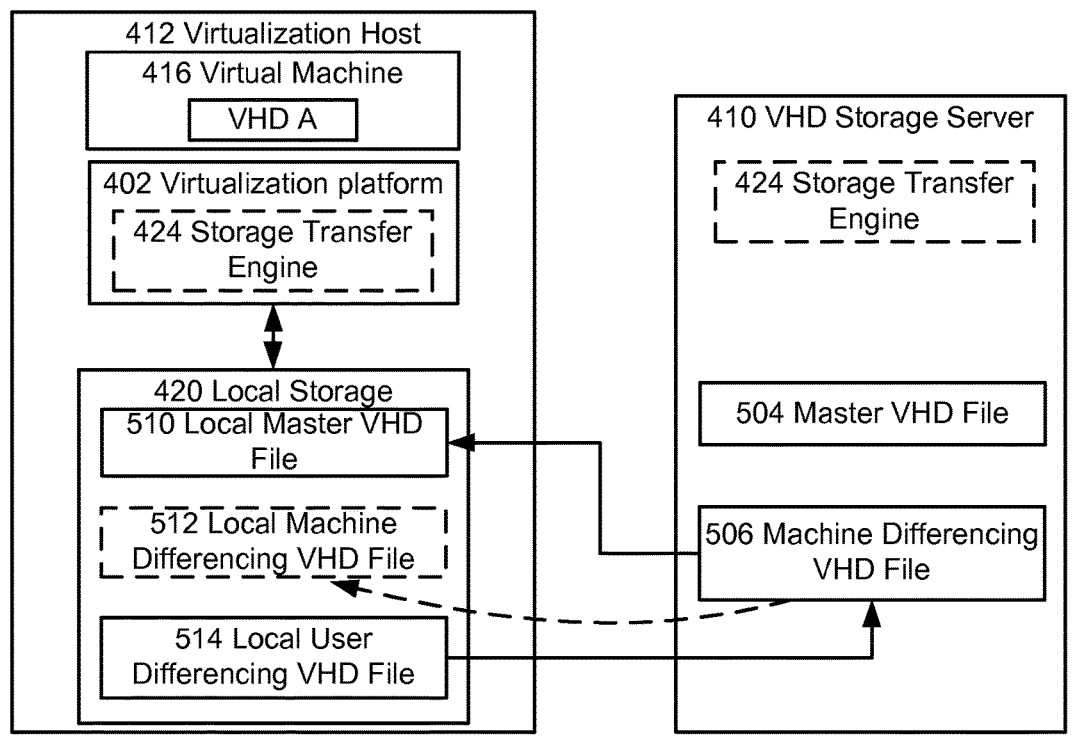
FIG. 8 depicts a high-level block diagram of a virtualization host and a VHD storage server.

FIG. 8 illustrates another alternative deployment. According to this exemplary embodiment, local storage 420 can include local user differencing VHD file 514 and local master VHD file 510 and VHD storage server 410 can include machine differencing VHD file 506. In this example, a configuration file for virtual machine 416 can include the location of local copy of user differencing VHD file 514. Local user differencing VHD file 514 can point to machine differencing VHD file 506 on VHD storage server 410, which can point to local master VHD file 510. Similar to the operations described above, while virtual machine 416 is running, a copy of machine differencing VHD file 506 can be downloaded to virtualization host 406 and stored as local machine differencing VHD file 512. Similar to above, after local machine differencing VHD file 512 is stored in local storage 420, a signal can be sent to virtualization platform 402 to adjust the link stored in local user differencing VHD file to point to the file system location of local machine differencing VHD file 512.

Figure 9:
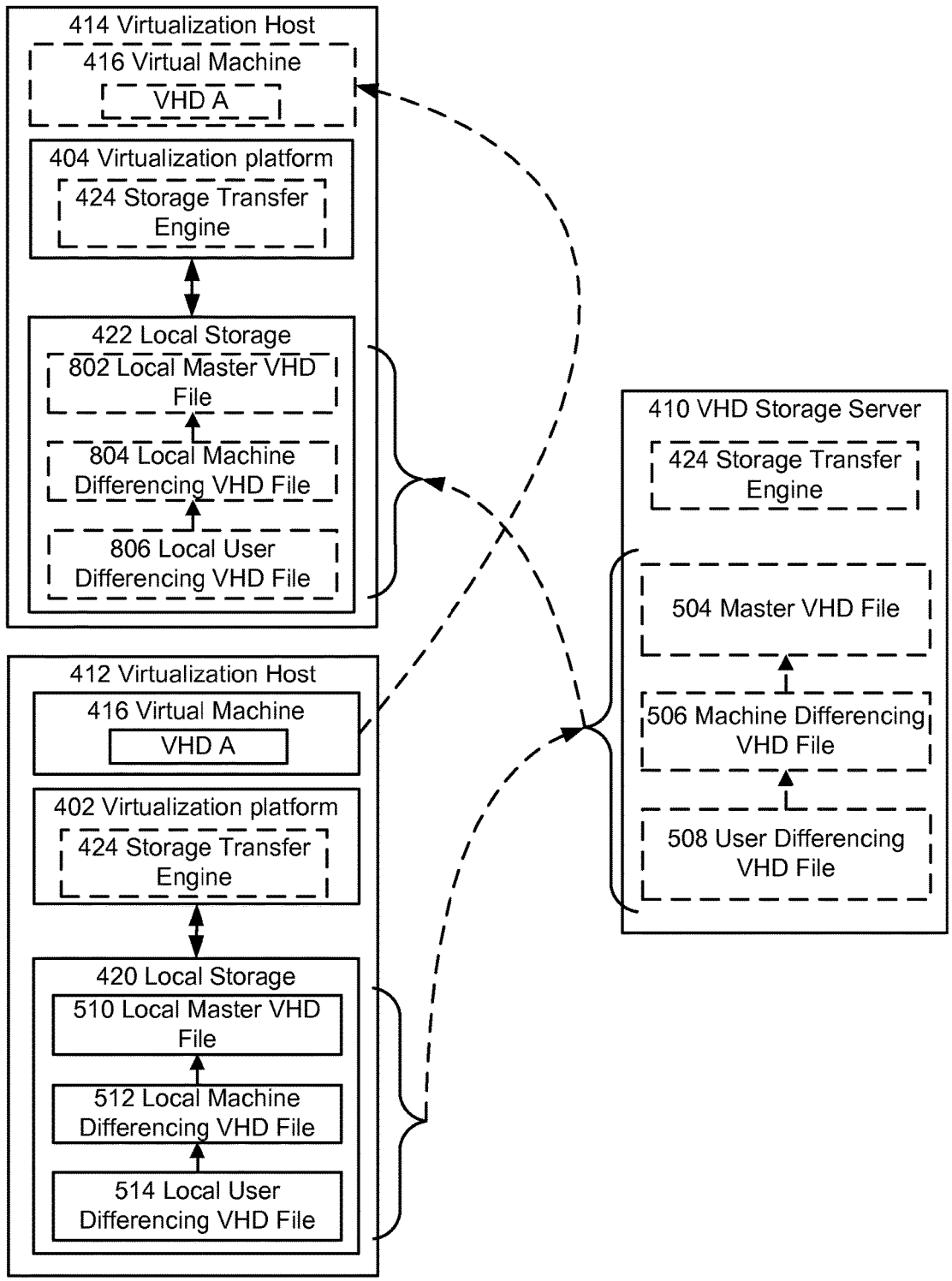
FIG. 9 depicts a high-level block diagram of two virtualization hosts and a VHD storage server.

Turning now to FIG. 9, it illustrates an operational environment for migrating virtual machine 416 from virtualization host 412 to virtualization host 414. In the illustrated embodiment, it is assumed that the chain of VHD files for virtual hard disk A has been downloaded to virtualization host 406 when the copy operation starts. However, this may not be the case and virtualization host 412 may have any combination of VHD files when a live-migration operation is initiated. When initiated, storage transfer engine 424 on, for example, virtualization host 412 can start copying the VHD files that are necessary to ensure that VHD A is copied to virtualization host 414. In a specific example, this may only include copying local user differencing VHD 514 to VHD storage server 410 and the file can be copied using the mirroring technique described above. After the files that need to be copied are uploaded to VHD storage server 410, control of VHD A can be switched from virtualization host 412 to virtualization host 414 and virtualization platform 404 can begin to download the files it needs to local storage 422. For example, virtualization host 414 may already include local master VHD file 802 and/or local machine differencing VHD file 804. Thus, in this example user differencing VHD file 508 can be copied to virtualization host 414 and stored as local user differencing VHD file 806. Similarly, virtualization host 404 can be configured to reset any links after the download is complete so that reads and writes are directed to local copies of the VHD files instead of the copies on VHD storage server 410.

The following are a series of flowcharts depicting operational procedures. For ease of understanding, the flowcharts are organized such that the initial flowcharts present implementations via an overall "big picture" viewpoint and subsequent flowcharts provide further additions and/or details that are illustrated in dashed lines. Furthermore, one of skill in the art can appreciate that the operational procedure depicted by dashed lines are considered optional.

Figure 10:
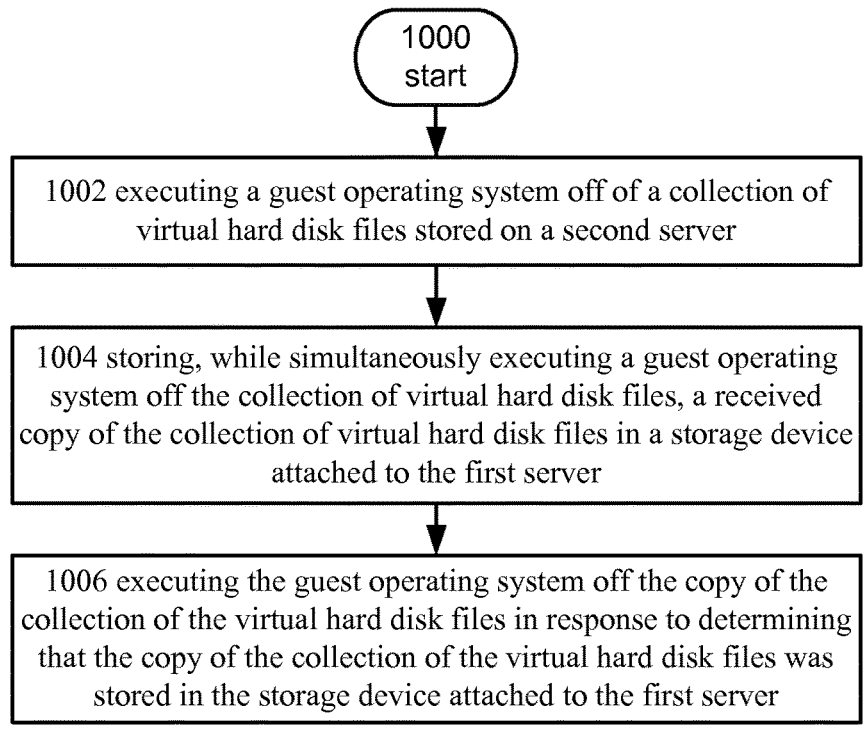
FIG. 10 depicts an operational procedure.

Turning now to FIG. 10, it shows an operational procedure which begins with operation 1000 and operation 1002 illustrates virtualization host 412 including circuitry for executing a guest operating system off of a collection of virtual hard disk files stored on a second server. For example, virtualization platform 402 could have previously opened up a collection, e.g. one or more VHD files, stored on a second server, e.g., stored in file system 428 of VHD storage server 410. Virtualization platform 402, e.g., executable instructions, can schedule a thread indicative of a virtual processor on a processor and the processor can execute a guest operating system that can issue IO jobs to the collection of VHD files stored in file system 428. An example IO job can be a read. In this example, virtualization platform 402 can receive the IO job and read the requested blocks of data from a VHD file over the internal network and send the bytes back to the guest OS.

Continuing with the description of FIG. 10, operation 1004 illustrates that in an embodiment the virtualization host can include circuitry for storing, while simultaneously executing a guest operating system off the collection of virtual hard disk files, a received copy of the collection of virtual hard disk files in a storage device attached to the first server. For example, and turning back to FIG. 4, virtualization host 412 can receive one or more packets of information indicative of a copy of a collection of virtual hard disk files from VHD storage server 410. The collection in this example could include, but is not limited to, a user differencing virtual hard disk file, a machine differencing virtual hard disk file, and/or a master virtual hard disk file. In this example, VHD storage server 410 can simultaneously copy the collection to local storage 420 while the guest operating system is running That is, virtual machine 416 can execute the guest operating system off the collection stored in VHD storage service 410 while a copy of the collection is downloaded.

Turning back to FIG. 10, operation 1006 shows that in an embodiment, virtualization host can include circuitry for executing the guest operating system off the copy of the collection of the virtual hard disk files in response to determining that the copy of the collection of the virtual hard disk files was stored in the storage device attached to the first server. Turning back to FIG. 4, in an exemplary embodiment the collection of virtual hard disk files can be successfully received by virtualization host 412 and stored in local storage 420. In this example, virtualization platform 402 can receive a signal indicating that the storage operation is complete and set the parent location information in a configuration file and/or in the virtual hard disk files so that the location information points to the local copies of the collection. After the parent location information is changed, virtualization platform 402 can use the updated location information to issue IO jobs to the local copy of the collection. Accordingly, since virtualization platform 402 no longer needs to read data over the internal network from VHD storage service 410, the processing stress on VHD storage service 410 is reduced and well as the demand on bandwidth.

Figure 11:
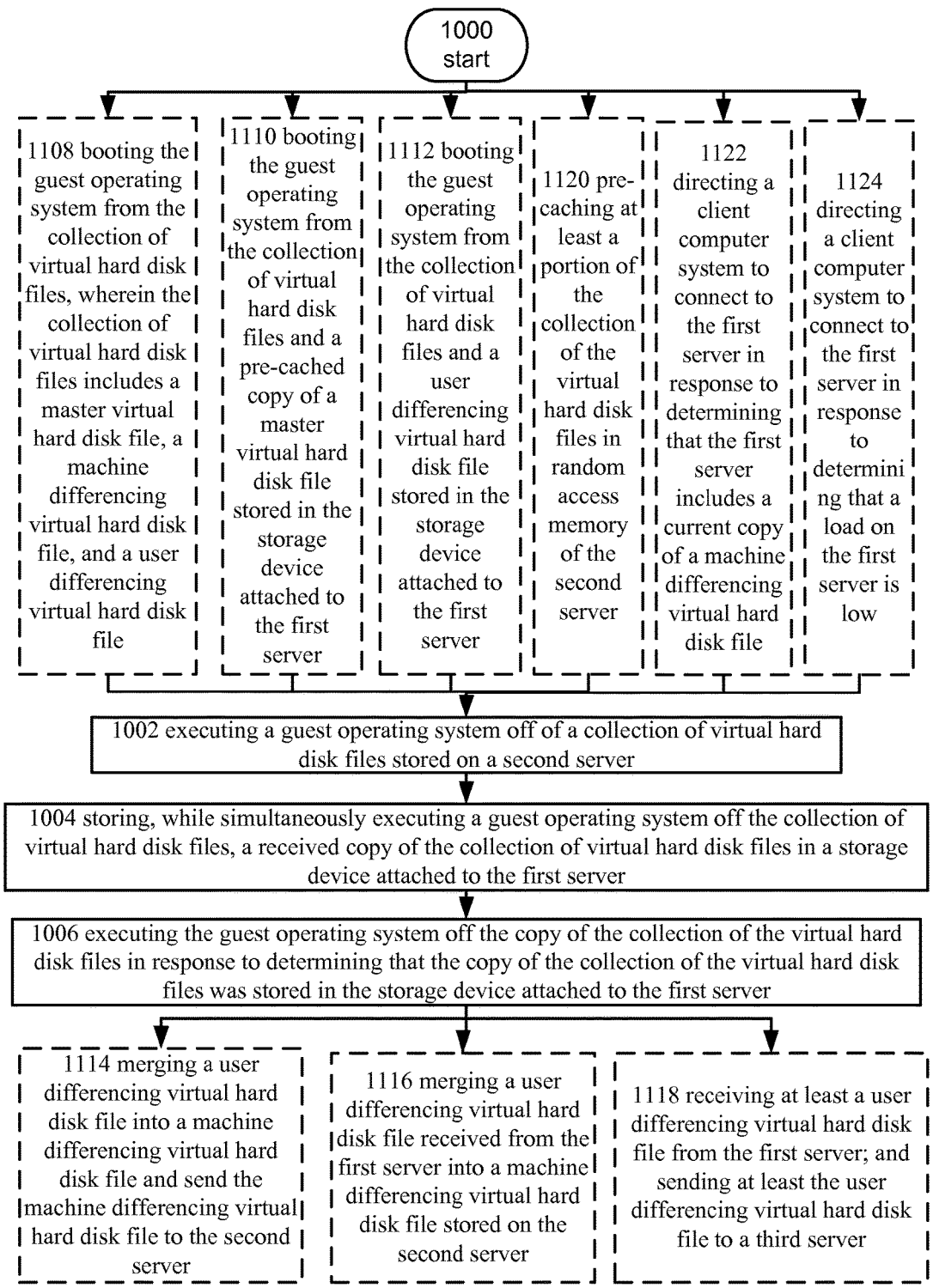
FIG. 11 depicts an alternative embodiment of the operational procedure of FIG. 10.

Referring to FIG. 11, it shows an alternative embodiment of the operational procedure of FIG. 10 including the operations 1108-1122. Turning to operation 1108, it illustrates that in an embodiment virtualization host 412 can include circuitry for booting the guest operating system from the collection of virtual hard disk files, wherein the collection of virtual hard disk files includes a master virtual hard disk file, a machine differencing virtual hard disk file, and a user differencing virtual hard disk file. For example, and turning to FIG. 5, in this exemplary embodiment, virtualization host 412 can boot the guest operating system from VHD storage server 410. In this example, the collection of VHD files stored thereon can include master VHD file 504, which can include a copy of an operating system, machine differencing VHD file 506, which can include information for customizing the operating system for a specific user such as a machine identifier, etc., and a user differencing VHD file, which can include data that has been written to disk during the session.

In an exemplary embodiment including operation 1108, the copy operation for the collection of VHD files could have started prior to booting the guest operating system and may complete after guest operating system begins executing, i.e., after a boot loader exits and turns control of virtual machine 416 over to the guest OS. When virtualization platform 402 received a request to boot the guest OS, all of files for VHD A may have been stored in VHD storage server 410 and virtualization platform 402 could determine the location of user differencing VHD file 508 from a configuration file. Virtualization platform 402 could use information in user differencing VHD file 508 to determine the location of machine differencing VHD file 506 and the location information in machine differencing VHD file 506 to determine the location of master VHD file 504. After the collection is downloaded, virtualization platform 402 can set the location in the configuration file to point to the location of local user differencing VHD file 514, the parent location information in local user differencing VHD file 514 to point to local machine differencing VHD file 512 and the parent information in local machine differencing VHD file 512 to point to local master VHD file 510. At this point, virtualization platform 402 will use the local copies of the VHD files for IO.

Continuing with the description of FIG. 11, operation 1110 shows that in an embodiment, virtualization host 412 can include circuitry for booting the guest operating system from the collection of virtual hard disk files and a pre-cached copy of a master virtual hard disk file stored in the storage device attached to the first server. For example, and turning to FIG. 6, in an exemplary embodiment the collection can include machine differencing VHD file 506 and user differencing VHD file 508. A copy of master VHD file 504 could be pre-cached in local storage 420 as local master VHD file 510. In this example, virtualization host 412 could be deployed in the datacenter with local master VHD file 510 stored in local storage 420 or when virtualization host 412 is turned on it can pre-copy master VHD file 504. In this configuration, network traffic caused by migrating master VHD file 504, which could be 8 gigabytes, is eliminated. Moreover, any read IO jobs directed to blocks in a master VHD file can be handled locally.

Continuing with the description of FIG. 11, operation 1112 shows that in an embodiment, virtualization host 412 can include circuitry for booting the guest operating system from the collection of virtual hard disk files and a user differencing virtual hard disk file stored in the storage device attached to the first server. In this exemplary embodiment, and turning to FIG. 7, the collection can include master VHD file 504 and machine differencing VHD file 506. While guest operating system is booting, i.e. a boot loader is in control of virtual machine 416, virtualization platform 402 can handle certain IO jobs by writing and reading from local user differencing VHD file 514 and handle others by reading from the collection stored in VHD storage server 410. In this example, local user differencing VHD file 514 can be empty prior to boot or it could be created dynamically when virtualization platform 402 receives a request to instantiate virtual machine 416. In the first scenario, a configuration file can include the location of the empty local user differencing VHD file 514. In the second, the configuration file can include the location of machine differencing VHD file 506 and virtualization platform 402 can dynamically generate local user differencing VHD file 514 and link it to machine differencing VHD file 506.

In either case, the location of machine differencing VHD file 506 and master VHD file 504 can be determined and storage transfer engine 424 can begin to copy them to local storage 420 thereby storing local machine differencing VHD file 512 and local master VHD file 510. After the collection is downloaded, virtualization platform 402 can change the parent location field in local user differencing VHD file 514 to point to the location of local machine differencing VHD file 512 and change the parent location field in local machine differencing VHD file 512 to point to the location of local master VHD file 510. At this point, virtualization platform 402 will use the local copies of the VHD files for IO.

Continuing with the description of FIG. 11, operation 1114 shows that in an embodiment, virtualization host 412 can include circuitry configured to merge a user differencing virtual hard disk file into a machine differencing virtual hard disk file and send the machine differencing virtual hard disk file to the second server. In a deployment where user data is persisted after a logoff, virtualization platform 402 can be configured to merge the data in local user differencing file 514 with the data in local machine differencing VHD file 512 and send the modified machine differencing VHD file back to VHD storage server 410. For example, Virtualization platform 402 can merge the two files by copying each block of data in local user differencing file 514 into the corresponding block in local machine differencing VHD file 512. After VHD storage server 410 receives the modified copy of local machine differencing VHD file 512, it can store it as machine differencing VHD file 506.

After the modified version is set as machine differencing VHD file 506, virtualization platform 402 can optionally delete local user differencing VHD file 514 and local machine differencing VHD file 512. For example, virtualization platform 412 can be configured to delete these files in the instance that storage capacity on local storage 420 is limited. In the instance that virtualization host 412 persists the merged copy of machine differencing VHD file in local storage 420 as local machine differencing VHD file 512, virtualization host 412 can send a signal to administrator server 408 to notify it that the next time client 406 connects, virtualization host 412 should host virtual machine 416.

Continuing with the description of FIG. 11, operation 1116 shows that in an embodiment, storage server 410 can include circuitry for merging a user differencing virtual hard disk file received from the first server into a machine differencing virtual hard disk file stored on the second server. In this exemplary embodiment, after a user logs off virtualization platform 402 can send local user differencing file 514 back to VHD storage server 410 and instruct storage transfer engine 424 to merge local user differencing file 514 with machine differencing VHD file 506. VHD storage server 410 can then store the modified machine differencing VHD file as machine differencing VHD file 506.

Continuing with the description of FIG. 11, operation 1118 shows that in an embodiment, the storage server can be configured to receive at least a user differencing virtual hard disk file from the first server; and send at least the user differencing virtual hard disk file to a third server. For example, and turning to FIG. 9, in an exemplary embodiment a live-migration operation can be used to migrate virtual machine 416 from virtualization host 412 to virtualization host 414 while virtual machine 416 is running. For example, storage transfer engine 424 can receive a signal indicating that virtual machine 416 is to be migrated from virtualization host 412 to virtualization host 414. In response, storage transfer engine 424 can determine which virtual hard disk files need to be copied in order to run virtual machine 416 on virtualization host 414. In this example, storage transfer engine 424 can determine that at least local user differencing VHD file 514 need to be copied. In this example, local user differencing VHD file 514 can be sent to VHD storage service 410 using the mirroring technique described above.

The operation to send at least the information stored in user differencing VHD file 508 can occur in parallel with an operation that copies the state of virtual machine 416, e.g., the contents of RAM and the state for virtual devices, from virtualization host 412 to virtualization host 414. In another configuration, the storage copy operations can occur before the live-migration operations begin. In either case, read-only files can be copied to VHD storage server 410 and read/write files can be mirrored. For example, storage transfer engine 424 running on virtualization host 412 can sequentially copy blocks of data from local user differencing VHD file 514 to VHD storage server 410 while sending writes to both local user differencing VHD file 514 and user differencing VHD file 508. When the copy operation is complete, virtualization platform 402 can modify the configuration file to set the location information to point at the location of user differencing VHD file 508 so that writes get send to VHD storage server 410. After control of virtual machine 416 is switched from virtualization platform 402 to virtualization platform 404, virtualization platform 404 can read blocks of data from VHD storage server 410 over the internal network. At this point, storage transfer engine 424 can be configured to copy at least user differencing VHD file 508 to virtualization host 414.

Continuing with the description of FIG. 11, operation 1120 shows that in an embodiment, storage server 410 can include circuitry for pre-caching at least a portion of the collection of the virtual hard disk files in random access memory of the second server. For example, and turning back to FIG. 5, in an exemplary embodiment a determination can be made as to what bytes are typically read during a boot operation for a type of operating system. For example, read IO jobs issued by virtualization platform 402 can be tracked over successive boot operations and a group of bytes that are typically read can be determined. In this example, VHD storage server 410 can be configured to pre-cache these bytes in RAM when it boots in order to have available for booting virtual machines. This can speed up the boot operations for virtual machines. For example, the persistent storage used to store virtual hard drives can be commodity hardware, e.g., off the shelf SATA drives, and having VHD storage server 410 read the bytes off this type of hardware introduces another layer of latency that is eliminated by pre-caching these bytes in RAM.

Continuing with the description of FIG. 11, operation 1122 shows that in an embodiment, the administrator server can include circuitry for directing a client computer system to connect to the first server in response to determining that the first server includes a current copy of a machine differencing virtual hard disk file. For example, and turning back to FIG. 4, in an embodiment administrator server 408 can include circuitry, e.g., a processor configured by executable instructions indicative of connection broker 426. In this example, the instructions can configure the processor to manage a table of information that identifies which virtualization host has VHD files along with timestamps indicating when they were last modified. In response to receiving a connection request from client 406 to connect to virtual machine 416, administrator server 408 can execute a program that checks the timestamps for the collection of VHD files for virtual hard disk A in VHD storage server 410 and compares the timestamps to the timestamps in the table. In the instance that there is a match, e.g., virtualization host 412 includes a machine differencing virtual hard disk file that has a timestamp that is equal to the timestamp associated with a machine differencing virtual hard disk file stored in VHD storage server 410, administrator server 408 can attempt to have virtual machine 416 loaded on virtualization host 412. This would eliminate having to copy at least some of the VHD files to virtualization host 412. In most cases, if virtualization host 412 includes a current copy of machine differencing VHD file it also includes a current copy of master VHD file. If this is the case, no files would have to be downloaded from VHD storage server 410.

Turning to operation 1124, it shows directing a client computer system to connect to the first server in response to determining that a load on the first server is low. For example, in an embodiment administrator server 408 can include circuitry, e.g., a processor configured by executable instructions indicative of connection broker 426. In this example, the instructions can configure the processor to manage a table of information that identifies which the current load each virtualization server is currently under. For example, the load information could indicate the amount of RAM allocated to virtual machines and how much total RAM each virtualization server has. In response to receiving a connection request from client 406 to connect to a virtual desktop session, administrator server 408 can execute a program that checks the load on each server and selects a server the least loaded server to host the virtual desktop session.

In an example embodiment where both operations 1122 and 1124 are executed, administrator server 408 can be configured to identify servers that have low loads thereon and then check the timestamps for the collection of VHD files for virtual hard disk A in VHD storage server 410 and compare the timestamps to the timestamps in the table. In the instance that there is a match, e.g., virtualization host 412 includes a machine differencing virtual hard disk file that has a timestamp that is equal to the timestamp associated with a machine differencing virtual hard disk file stored in VHD storage server 410, administrator server 408 can attempt to have virtual machine 416 loaded on virtualization host 412.

Figure 12:
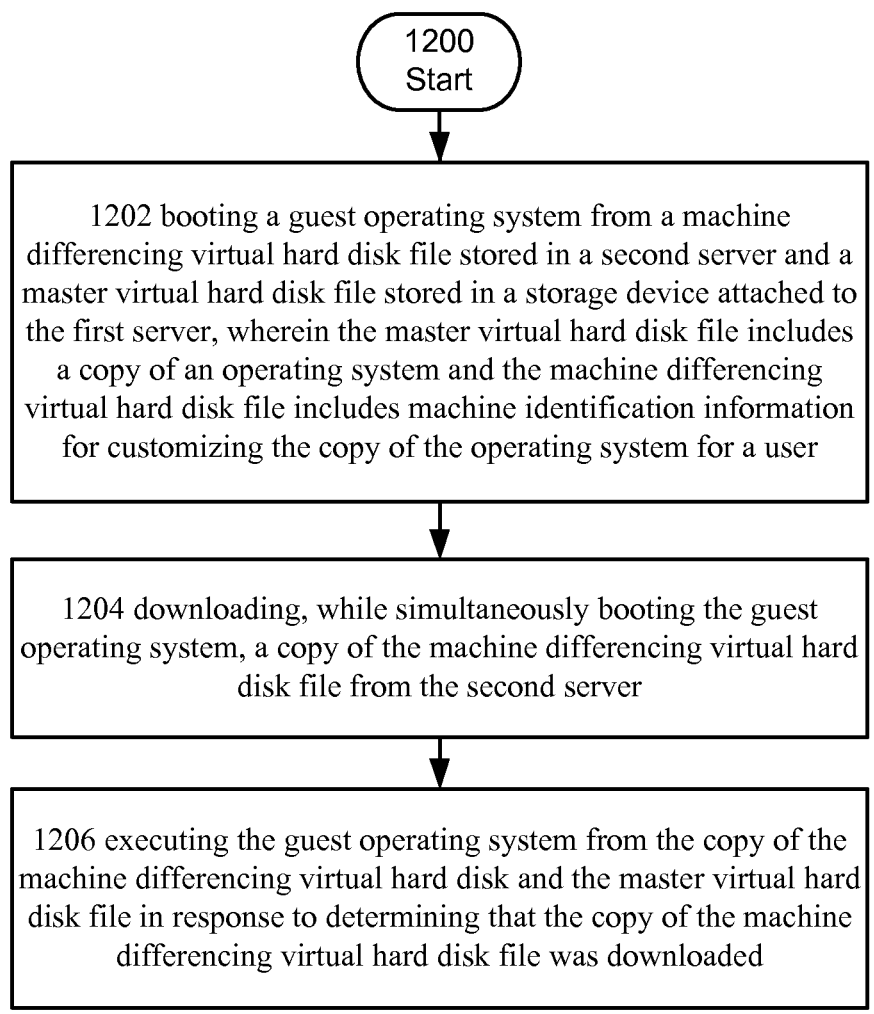
FIG. 12 depicts an operational procedure.

Turning now to FIG. 12, it illustrates an exemplary embodiment for describing operations related to executing a virtual machine from networked storage. Operation 1200 begins the operational procedure and operation 1202 illustrates the operation booting a guest operating system from a machine differencing virtual hard disk file stored in a second server and a master virtual hard disk file stored in a storage device attached to the first server, wherein the master virtual hard disk file includes a copy of an operating system and the machine differencing virtual hard disk file includes machine identification information for customizing the copy of the operating system for a user. For example, and referring to FIG. 6 or 8, in an exemplary embodiment, virtualization host 412 can include local master VHD file 510. For example, local master VHD file 510 could have been previously downloaded or virtualization host 412 could be deployed with a copy. In any event, virtualization platform 402 can boot a guest operating system from the combination of information in local master VHD file 510 and machine differencing VHD file 506.

Virtualization platform 402 can initialize a boot operation in response to a request received from administrator server 408 of FIG. 4. Virtualization platform 402 can receive a configuration file associated with the user account of a user logging on via client 406 of FIG. 4. Virtualization platform 402 can access the configuration file and a field stored therein can include the location of, for example, a user differencing VHD disk file, which could be stored in local storage 420 or on VHD storage server 410. From the user differencing VHD disk file, the location of its parent, machine differencing VHD file 506 can be discovered. In this example, machine differencing VHD file 506 can reside in storage of VHD storage server 410 and its parent can be local master VHD file 510. After the VHD files that form VHD A are opened virtualization platform 402 can being booting a guest operating system off of it by sending read IO requests that are handled by machine differencing VHD file 506 to VHD storage server 410 and read IO requests that are handled by local master VHD file 510 to local storage 420.

Continuing with the description of FIG. 12, operation 1204 shows an operation for downloading, while simultaneously booting the guest operating system, a copy of the machine differencing virtual hard disk file from the second server. For example, and turning to FIG. 6 or 8, virtualization host 412 can receive one or more packets of information indicative of a copy of machine differencing VHD file 506 from VHD storage server 410 and store the copy as local machine differencing VHD file 512. In this example VHD storage server 410 may be simultaneously copying the machine differencing VHD file 506 to local storage 420 during the boot operation. That is, while virtual machine 416 is booting from the combination while a copy is simultaneously being downloaded.

Turning again back to FIG. 12, operation 1206 illustrates an operation for executing the guest operating system from the copy of the machine differencing virtual hard disk and the master virtual hard disk file in response to determining that the copy of the machine differencing virtual hard disk file was downloaded. Turning back to FIG. 6 or 8, in an exemplary embodiment local machine differencing VHD file 512 can be successfully stored in the file system of virtualization host 412. In this example, virtualization platform 402 can receive a signal indicating that the storage operation is complete and set the parent location information in a user differencing VHD file's parent location field to point to the location of local machine differencing VHD file 512. After the location is changed, virtualization platform 402 can use the updated location information to perform IO operations on the local copy.

Figure 13:
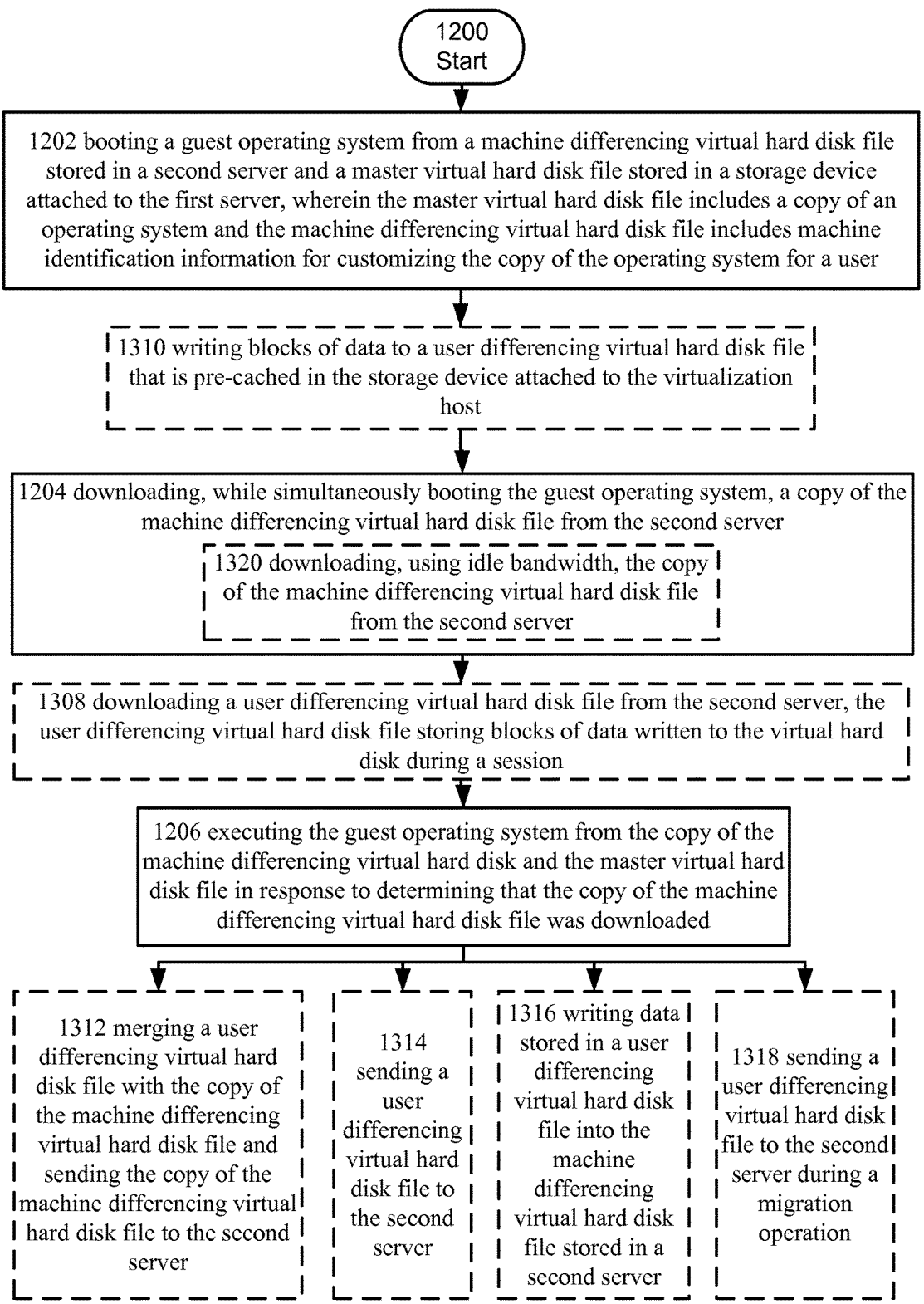
FIG. 13 depicts an alternative embodiment of the operational procedure of FIG. 12.

Turning now to FIG. 13, it illustrates an alternative embodiment of the operational procedure depicted by FIG. 12 including operations 1308-1320. As shown by operation 1308, in an embodiment virtualization host 412 can include circuitry for downloading a user differencing virtual hard disk file from the second server, the user differencing virtual hard disk file storing blocks of data written to the virtual hard disk during a session. Turning to FIG. 6, in this embodiment user differencing VHD disk 508 can be copied from VHD storage server 410 to virtualization host 412 and stored as local user differencing VHD disk 514. As shown by the figure, in this example virtualization platform 402 could receive a configuration file that includes a parent location field including the location of user differencing VHD file 508. A parent location field in user differencing VHD file 508 can include the location for machine differencing VHD file 506 and its parent field can include the location of local master VHD file 510. Storage transfer engine 424 can sequentially copy blocks of data from user differencing VHD file 508 to local user differencing VHD file 514. While it is being copied, virtualization platform 402 can send writes to both local user differencing VHD file 514 and user differencing VHD file 508 until the last block of user differencing VHD file 508 is copied. At that point, virtualization platform 402 can be configured to stop writing to user differencing VHD file 508 and can change the location field in the configuration file to point to the location of local user differencing VHD file 514 instead of user differencing VHD file 508. At this point, virtualization platform 402 will use the local copy of user differencing VHD file 514 for associated IO operations.

Continuing with the description of FIG. 13, it illustrates operation 1310, which is an operation for writing blocks of data to a user differencing virtual hard disk file that is pre-cached in the storage device attached to the first server. For example, and turning to FIG. 8, in this exemplary embodiment, local storage 420 can include local user differencing VHD file 514. In this exemplary embodiment, local user differencing VHD file 514 can be pre-cached in local storage 420 so that it does not have to be copied across the network. For example, when virtualization platform 402 boots virtual machine 416, it can be configured to generate an empty local user differencing VHD file 514. As a virtual processor writes to VHD A, the writes can be stored in the blocks of local user differencing VHD file 514 and it can grow from 0 bytes. In this exemplary embodiment, each time virtualization platform 402 writes to virtualization platform 402 it can set a bit in a bitmap. When a read IO job is received by virtualization platform 402, it can be configured to check the bitmap to see if a bit is set for the block. If it is, virtualization platform 402 can read the bytes stored in the block from local user differencing VHD file 514. In the event that the bit is not set, virtualization platform 402 can be configured to check a bitmap for local machine differencing VHD file 512. If the bitmap for local machine differencing VHD file 512 is not set, virtualization platform 402 can read the blocks from local master VHD file 510.

Operation 1312 shows that in an embodiment, virtualization host 412 can include circuitry for merging a user differencing virtual hard disk file with the copy of the machine differencing virtual hard disk file and sending the copy of the machine differencing virtual hard disk file to the second server. In a deployment where user data is persisted, virtualization platform 402 can be configured to merge the data in local user differencing file 514 with the data in local machine differencing VHD file 512 and send the modified machine differencing VHD file back to VHD storage server 410. For example, virtualization platform 402 can merge the two files by copying each block of data in local user differencing file 514 into the corresponding block in local machine differencing VHD file 512. After VHD storage server 410 receives the modified copy of local machine differencing VHD file 512, it can store it as machine differencing VHD file 506.

Operation 1314 shows that in an embodiment, virtualization host 412 can include circuitry for sending a user differencing virtual hard disk file to the second server. In this exemplary embodiment, after a user logs off virtualization platform 402 can send local user differencing file 514 back to VHD storage server 410 and instruct storage transfer engine 424 to merge local user differencing file 514 with machine differencing VHD file 506. VHD storage server 410 can then store the modified machine differencing VHD file as machine differencing VHD file 506.

Operation 1316 shows that in an embodiment, virtualization host 412 can include circuitry for writing data stored in a user differencing virtual hard disk file into the machine differencing virtual hard disk file stored in a second server. In this exemplary embodiment, storage transfer engine 424 executing in virtualization host 412 can be configured to merge the differences in local user differencing VHD file 514 into machine differencing VHD file 506. For example, storage transfer engine 424 can open up machine differencing VHD file 506 and write blocks of data from user differencing VHD file 514 across the internal network into corresponding blocks in machine differencing VHD file 506.

Turning to operation 1318, it shows that virtualization 412 host can include circuitry for sending a user differencing virtual hard disk file to the second server during a migration operation. For example, and turning to FIG. 9, in an exemplary embodiment a live-migration operation can be used to migrate virtual machine 416 from virtualization host 412 to virtualization host 414 while it is running. For example, storage transfer engine 424 can receive a signal indicating that virtual machine 416 is to be migrated from virtualization host 412 to virtualization host 414. In response, storage transfer engine 424 can determine which virtual hard disk files need to be copied in order to run virtual machine 416 on virtualization host 414. In this example, storage transfer engine 424 can determine that at least local user differencing VHD file 514 need to be migrated. In this example, local user differencing VHD file 514 can be sent to VHD storage service 410 using the mirroring technique described above. Moreover, this operation can occur in parallel with an operation that copies the state of virtual machine 416 from virtualization host 412 to virtualization host 414

Referring back to FIG. 13, operation 1320 shows downloading, using idle bandwidth, the copy of the machine differencing virtual hard disk file from the second server. For example, in an embodiment storage transfer engine 424 executing on, for example virtualization host 412 and/or VHD storage server 410 can determine to download machine differencing VHD file 506 using the idle bandwidth of the internal network. In this example, the system is optimized for executing virtual machine 416 and copies occur when the network is otherwise idle. Or put another way, if 80% of the bandwidth is being used, storage transfer engine 424 may use up to 20% of the remaining bandwidth to send machine differencing VHD file 506 to virtualization host 412.

Figure 14:
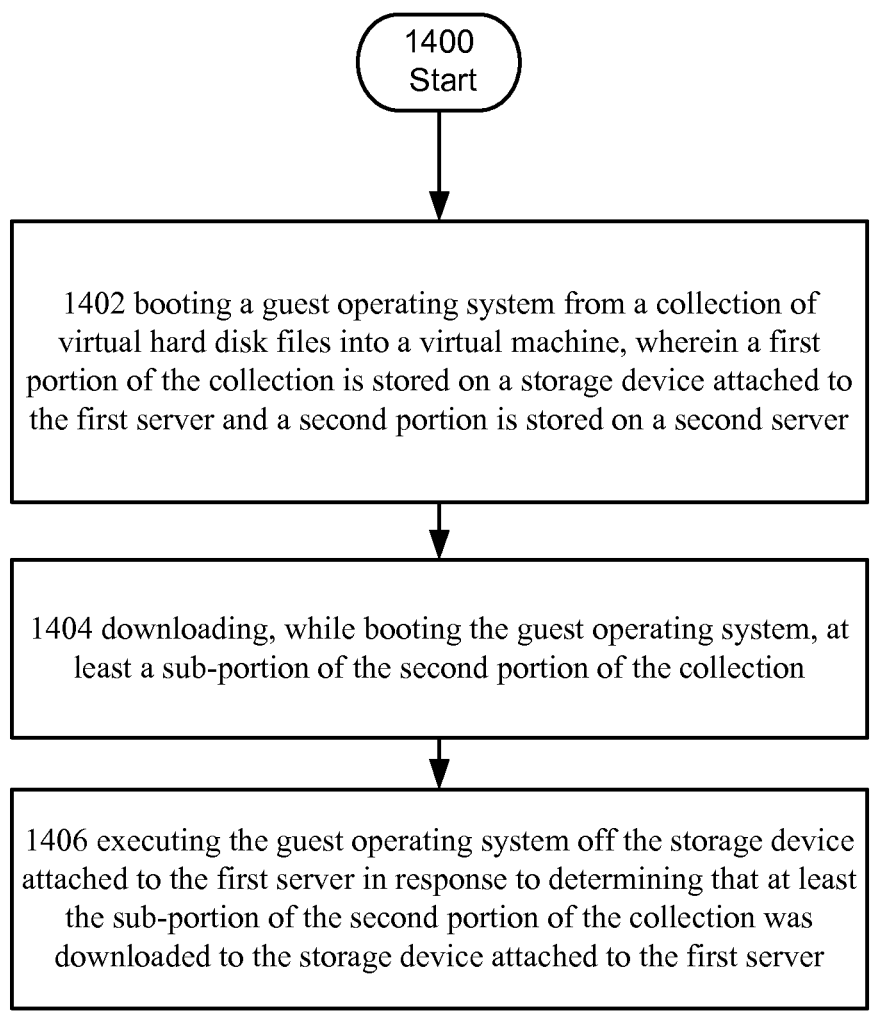
FIG. 14 depicts an operational procedure.

Turning now to FIG. 14, it illustrates an operational procedure. Operation 1400 begins the process, and operation 1402 illustrates an operation for booting a guest operating system from a collection of virtual hard disk files into a virtual machine, wherein a first portion of the collection is stored on a storage device attached to the first server and a second portion is stored on a second server. For example, a processor in virtualization host 412 can receive a thread indicative of a virtual processor running a boot loader. The processor can run virtualization platform 402 and determine that the boot loader is requesting bytes that are stored in collection of VHD files. Some of the collection of VHD files can be stored in local storage 420 and others can be stored on VHD storage server 410. In this example, virtualization platform 420 can fetch the bytes and return them to the boot loader, which can then continue to boot the guest OS.

Continuing with the description of FIG. 14, operation 1404 shows downloading, while booting the guest operating system, at least a sub-portion of the second portion of the collection. For example, while the boot loader is running and in control of virtual machine 416, virtualization host 412 can download one or more packets of information indicative of a copy of at least a sub-portion of the first portion. For example, in an embodiment storage transfer engine 424 executing on, for example VHD storage server 410 can be configured to send at least some of the virtual hard disk files it is storing to virtualization host 412. In a specific example, and turning to FIG. 6, storage transfer engine 424 can be configured to send machine differencing VHD file 506 and/or user differencing VHD file 508 to virtualization host 412.

The determination as to whether or not to send one or both can be made based on the available bandwidth in internal network and the load that VHD storage server 410 is under. For example, if VHD storage server 410 is handing multiple requests from multiple virtual machines, it can be configured to delay migrating some or all of the VHD files until idle processor cycles are available. In the same or another embodiment, if the available bandwidth is low, storage transfer engine 424 can be configured to delay migrating some or all of the VHD files until bandwidth is available.

Figure 15:
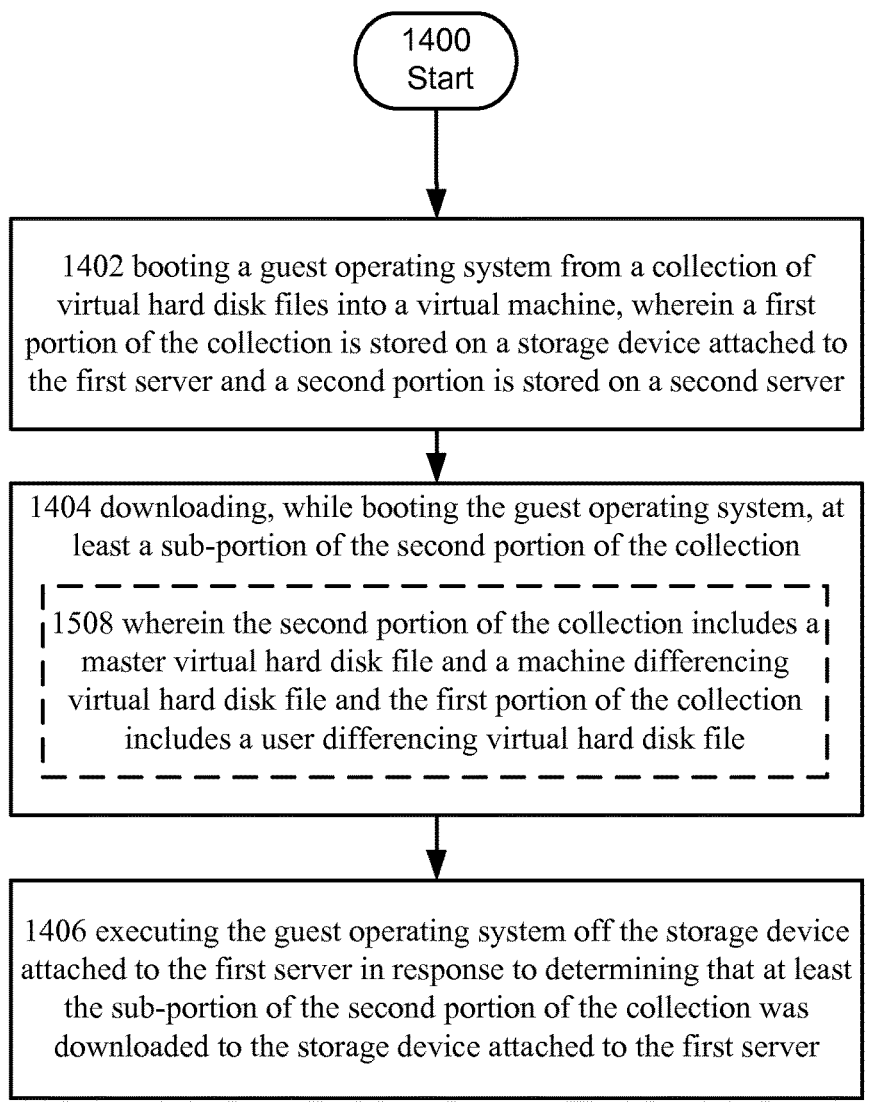
FIG. 15 depicts an alternative embodiment of the operational procedure of FIG. 14.

Turning to operation 1406, it shows executing the guest operating system off the storage device attached to the first server in response to determining that at least the sub-portion of the second portion of the collection was downloaded to the storage device attached to the first server. In an exemplary embodiment, sometime after the boot loader has exited and the guest OS is in control of virtual machine 416 the first portion can be successfully downloaded to local storage 420. Virtualization platform 402 can receive a signal indicating that the storage operation is complete and modify the parent location fields in any downloaded VHD files to point to downloaded copies. At this point, virtualization platform 402 can use the updated location information to perform IO operations on the local copy of the VHD files. Accordingly, since virtualization platform 402 no longer needs to send read/write operations over the internal network to VHD storage service 410, the stress on VHD storage service 410 is reduced and well as the demand on bandwidth Referring now to FIG. 15, it illustrates an alternative operational procedure for the operational procedure illustrated in FIG. 14 including refinement 1508. As shown by the figure, refinement 1508 shows that in an embodiment the second portion of the collection includes a master virtual hard disk file and a machine differencing virtual hard disk file and the first portion of the collection includes a user differencing virtual hard disk file. In this exemplary embodiment, and turning to FIG. 7, the collection can include master VHD file 504 and machine differencing VHD file 506. While guest operating system is booting, virtualization platform 402 can send write IO jobs and certain read IO jobs to local user differencing VHD file 514 and send read IO jobs for the collection to VHD storage server 410. In this example, local user differencing VHD file 514 can be empty prior to boot or it could be created dynamically when virtualization platform 402 receives a request to instantiate virtual machine 416. In the first scenario, a configuration file can include the location of the empty local user differencing VHD file 514. In the second, the configuration file can include the location of machine differencing VHD file 506 and information that directs virtualization platform 402 to create local user differencing VHD file 514 and link it to machine differencing VHD file 506.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed is:

1. A system for deploying virtual hard drives to virtual machine hosts, comprising:
a first server, comprising:
a first processor; and
a first memory coupled to the first processor, the first memory including instructions that upon execution cause the first server to:
execute a guest operating system off of a collection of remote virtual hard disk files stored on a second server, wherein the collection of remote virtual hard disk files comprise a single virtual hard disk for the guest operating system, and wherein the collection of remote virtual hard disk files comprises a machine differencing hard disk file, wherein the machine differencing hard disk file provisions a master virtual hard disk for a user;
store, while simultaneously executing the guest operating system off the collection of remote virtual hard disk files, a copy of the collection of remote virtual hard disk files received from at least the second server in a storage device attached to the first server; and
execute the guest operating system off the stored copy of the collection of the remote virtual hard disk files in response to determining that the copy of the collection of the remote virtual hard disk files was stored in the storage device attached to the first server.

2. The system of claim 1, wherein the first memory further comprises instructions that upon execution cause the first server to:
boot the guest operating system from the collection of remote virtual hard disk files, wherein the collection of remote virtual hard disk files includes the master virtual hard disk file, the machine differencing virtual hard disk file, and a user differencing virtual hard disk file.

3. The system of claim 1, wherein the first memory further comprises instructions that upon execution cause the first server to:
boot the guest operating system from the collection of remote virtual hard disk files and a pre-cached copy of the master virtual hard disk file stored in the storage device attached to the first server.

4. The system of claim 1, wherein the first memory further comprises instructions that upon execution cause the first server to:
boot the guest operating system from the collection of remote virtual hard disk files and a user differencing virtual hard disk file stored in the storage device attached to the first server.

5. The system of claim 1, wherein the first memory further comprises instructions that upon execution cause the first server to:
merge a user differencing virtual hard disk file into a machine differencing virtual hard disk file and send the machine differencing virtual hard disk file to the second server.

6. The system of claim 1, further comprising:
the second server, comprising:
a second processor; and
a second memory coupled to the second processor, the second memory including instructions that upon execution cause the second server to:
merge a user differencing virtual hard disk file received from the first server into a machine differencing virtual hard disk file stored on the second server.

7. The system of claim 1, further comprising:
the second server, comprising:
a second processor; and
a second memory coupled to the second processor, the second memory including instructions that upon execution cause the second server to:
receive at least a user differencing virtual hard disk file from the first server; and
send at least the user differencing virtual hard disk file to a third server.

8. The system of claim 1, further comprising:
the second server, comprising:
a second processor; and
a second memory coupled to the second processor, the second memory including instructions that upon execution cause the second server to:
pre-cache at least a portion of the collection of the remote virtual hard disk files in random access memory of the second server.

9. The system of claim 1, further comprising:
a fourth server, comprising:
a fourth processor; and
a fourth memory coupled to the fourth server, the fourth memory including instructions that upon execution cause the fourth server to:
direct a client computer system to connect to the first server in response to determining that the first server includes a current copy of the machine differencing virtual hard disk file.

10. The system of claim 1, further comprising:
a fourth server, comprising:
a fourth processor; and
a fourth memory coupled to the fourth server, the fourth memory including instructions that upon execution cause the fourth server to:
direct a client computer system to connect to the first server in response to determining that a load on the first server is low.

11. A method for streaming a virtual hard disk carried out on at least a first server, the method comprising:
booting a guest operating system from a machine differencing virtual hard disk file stored in a second server and a master virtual hard disk file stored in a storage device attached to the first server, wherein the master virtual hard disk file includes a copy of an operating system and the machine differencing virtual hard disk file provisions the master virtual hard disk for a user and includes machine identification information for customizing the copy of the operating system for a user;
downloading, while simultaneously booting the guest operating system, a copy of the machine differencing virtual hard disk file from the second server; and
executing the guest operating system from the copy of the machine differencing virtual hard disk and the master virtual hard disk file in response to determining that the copy of the machine differencing virtual hard disk file was downloaded.

12. The method of claim 11, further comprising:
downloading a user differencing virtual hard disk file from the second server, the user differencing virtual hard disk file storing blocks of data written to the virtual hard disk during a session.

13. The method of claim 11, further comprising:
writing blocks of data to a user differencing virtual hard disk file that is pre-cached in the storage device attached to the first server.

14. The method of claim 11, further comprising:
merging a user differencing virtual hard disk file with the copy of the machine differencing virtual hard disk file and sending the copy of the machine differencing virtual hard disk file to the second server.

15. The method of claim 11, further comprising:
sending a user differencing virtual hard disk file to the second server.

16. The method of claim 11, further comprising:
writing data stored in a user differencing virtual hard disk file into the machine differencing virtual hard disk file stored in a second server.

17. The method of claim 11, further comprising:
sending a user differencing virtual hard disk file to the second server during a migration operation.

18. The method of claim 11, wherein downloading the copy of the machine differencing virtual hard disk file from the storage server further comprises:
downloading, using idle bandwidth, the copy of the machine differencing virtual hard disk file from the second server.

19. A non-transitory computer-readable storage device including executable instructions for streaming a virtual machine to a first server, comprising instructions that upon execution cause the first server to:
boot a guest operating system from a collection of remote virtual hard disk files into a virtual machine, wherein a first portion of the collection is stored on a storage device attached to the first server and a second portion is stored on a second server, wherein the collection of remote virtual hard disk files, formed as a single virtual hard disk file, are combined to boot the guest operating system;
download, while booting the guest operating system, at least a sub-portion of the second portion of the collection; and
execute the guest operating system off the storage device attached to the first server in response to determining that at least the sub-portion of the second portion of the collection was downloaded to the storage device attached to the first server.

20. The computer-readable storage device of claim 19, wherein the second portion of the collection includes a master virtual hard disk file and a machine differencing virtual hard disk file and the first portion of the collection includes a user differencing virtual hard disk file.

* * * * *